United States Patent
Nakao

(10) Patent No.: US 11,360,710 B2
(45) Date of Patent: Jun. 14, 2022

(54) STORAGE CONTROL DEVICE, DISTRIBUTED STORAGE SYSTEM, AND NON-TRANSITORY COMPUTER-READABLE STORAGE MEDIUM FOR STORING STORAGE CONTROL PROGRAM

(71) Applicant: FUJITSU LIMITED, Kawasaki (JP)

(72) Inventor: Takanori Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 17/006,960

(22) Filed: Aug. 31, 2020

(65) Prior Publication Data

US 2021/0064297 A1    Mar. 4, 2021

(30) Foreign Application Priority Data

Sep. 4, 2019    (JP) .............................. JP2019-160998

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0629* (2013.01); *G06F 3/0644* (2013.01); *G06F 3/0653* (2013.01); *G06F 3/0683* (2013.01)

(58) Field of Classification Search
None
See application file for complete search history.

(56) References Cited

U.S. PATENT DOCUMENTS 9,823,854 B2 *  11/2017  Valenzuela ......... G06F 12/0284
11,138,080 B2 * 10/2021  Lee ...................... G11C 16/225

FOREIGN PATENT DOCUMENTS

JP    H09-205634 A    8/1997
JP    2009-124527 A   6/2009

* cited by examiner

*Primary Examiner* — Midys Rojas
(74) *Attorney, Agent, or Firm* — Fujitsu Patent Center

(57) ABSTRACT

A storage control device configured to operate as one of a plurality of storage control devices in a distributed storage system configured to distributively arrange divided data in at least a part of the plurality of storage control devices, the divided data being created by dividing original data into a plurality of pieces. The storage control device is configured to: identify a storage position of management information to be used for reproducing of the original data; acquire the management information; store the management information in a first area corresponding to the position of the management information in the original data; store the divided data in a second area corresponding to a relative position of the divided data in the original data; and create reproduction data by using the divided data, the reproduction data including dummy data stored in a third area other than the first and second area.

6 Claims, 12 Drawing Sheets

STORAGE CONTROL DEVICE, DISTRIBUTED STORAGE SYSTEM, AND NON-TRANSITORY COMPUTER-READABLE STORAGE MEDIUM FOR STORING STORAGE CONTROL PROGRAM

CROSS-REFERENCE TO RELATED APPLICATION

This application is based upon and claims the benefit of priority of the prior Japanese Patent Application No. 2019-160998, filed on Sep. 4, 2019, the entire contents of which are incorporated herein by reference.

FIELD

The embodiments discussed herein are related to a storage control device, a distributed storage system, and a non-transitory computer-readable storage medium for storing a storage control program.

BACKGROUND

In recent years, a distributed storage system that distributes and stores data in a plurality of storage nodes coupled via a network is known.

In such a distributed storage system, in order to reduce the amount of data to be transferred over the network, a method is known in which each storage node performs arithmetic processing on data to be stored. In this manner, a method of performing arithmetic processing in the vicinity (node) of the data storage position may be referred to as neighborhood processing.

As the neighborhood processing, for example, tagging or searching of moving image data, or analysis of the moving image data that appears in the image may be performed.

Examples of the related art include Japanese Laid-open Patent Publication No. 2009-124527 and Japanese Laid-open Patent Publication No. 9-205634.

SUMMARY

According to an aspect of the embodiments, provided is a storage control device configured to operate as one of a plurality of storage control devices in a distributed storage system, the distributed storage system being configured to distributively arrange divided data in at least a part of the plurality of storage control devices, the divided data being created by dividing original data into a plurality of pieces. In an example, the storage control device includes: a memory configured to store program instructions; and a processor configured to perform the program instructions, the program instructions including: executing an acquisition processing configured to in response to a processing request for the divided data, identify a storage position of management information in the original data corresponding to the divided data of the processing request, the management information being information to be used for reproducing the original data, and acquire the management information by using the identified storage position; and executing a creation processing configured to store the management information in a first area corresponding to the position of the management information in the original data, store the divided data in a second area corresponding to a relative position of the divided data in the original data, and create reproduction data by using the divided data, the reproduction data including dummy data stored in a third area other than the first area and the second area.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
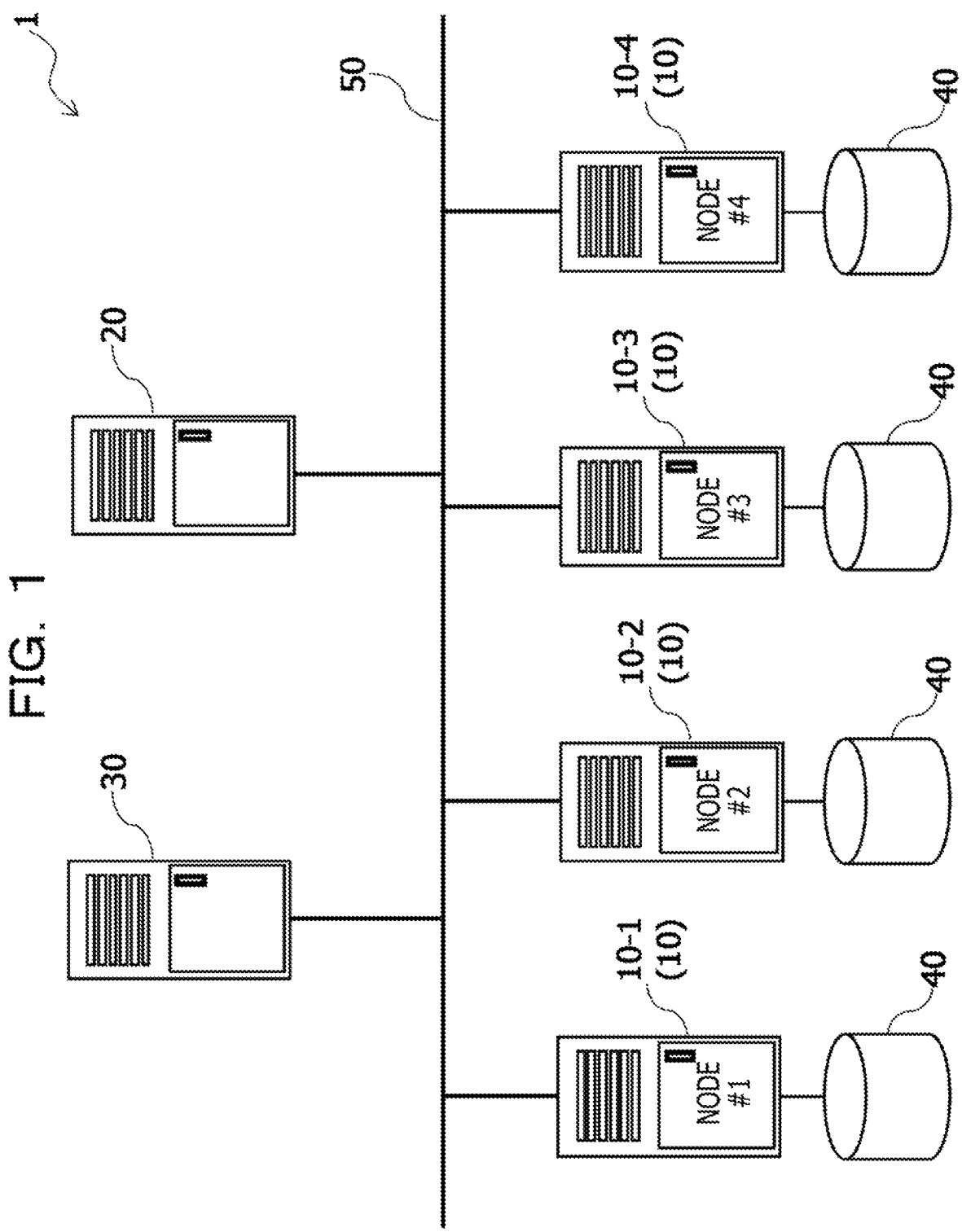
FIG. 1 schematically illustrates a configuration of a distributed storage system as an example of a first embodiment.

In such a distributed storage system of related art, when a file is divided into a plurality of nodes and recorded, a plurality of divided files are created by dividing the file into predetermined sizes from the beginning, and these divided files are recorded in different storage nodes, respectively.

However, for example, in a moving image file, metadata including a decoding rule or the like is stored in a header portion, and therefore, a divided file created by dividing the moving image file into a predetermined size may not be reproduced alone as a moving image.

Therefore, in order to perform neighborhood processing of a moving image file, it is indispensable to aggregate and reproduce a plurality of divided files constituting the same moving image file in one storage node. For this reason, there is a problem in that the amount of data to be transferred in the network is increased by transferring the distributed file from each storage node to the storage node that performs the neighborhood processing.

In one aspect, the present invention aims to reduce the amount of data to be transferred over a network.

Embodiments of the present storage control device, distributed storage system, and storage control program will be described below with reference to drawings. However, the embodiments described below are merely examples, and are not intended to exclude the application of various modifications and techniques not explicitly described in the embodiments. That is, the present embodiments may be variously modified and implemented without departing from the spirit thereof. Further, each drawing is not intended to include only the constituent elements illustrated in the drawing, and may include other functions and the like.

(I) Description of First Embodiment (A) Configuration

Figure 2:
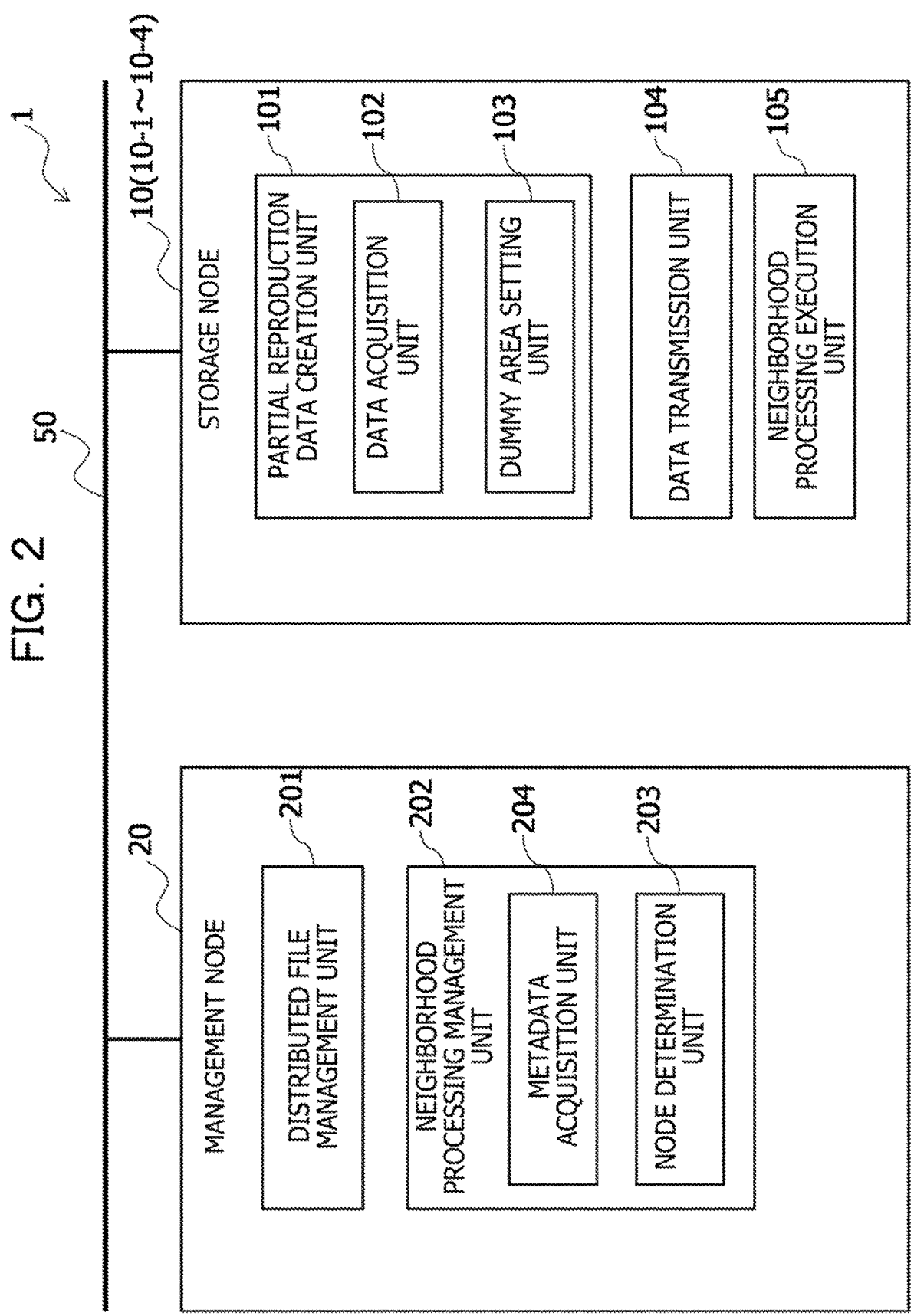
FIG. 2 illustrates a functional configuration of the distributed storage system as an example of the first embodiment.

FIG. 1 schematically illustrates the configuration of a distributed storage system 1 as an example of a first embodiment, and FIG. 2 illustrates the functional configuration thereof. Further, for the sake of convenience, FIG. 2 illustrates one of a plurality of storage nodes 10 illustrated in FIG. 1 and a management node 20.

As illustrated in FIG. 1, the distributed storage system 1 includes the management node 20, a host device 30, and a plurality of (four in the example illustrated in FIG. 1) storage nodes 10-1 to 10-4.

In the example illustrated in FIG. 1, the host device 30, the management node 20, and the storage nodes 10-1 to 10-4 are communicably coupled to each other via a network 50. Hereinafter, the four storage nodes 10-1 to 10-4 will be referred to as storage nodes 10 unless otherwise specified.

The network 50 is, for example, a local area network (LAN). The configuration of the distributed storage system 1 is not limited thereto, and may be appropriately changed and implemented. For example, the number of storage nodes 10 is not limited to four, and may be three or less or five or more storage nodes 10. In addition, the network 50 is not limited to the LAN, and may be appropriately changed and implemented. Further, the coupling relationship between the host device 30, the management node 20, and the storage nodes 10-1 to 10-4 may be appropriately changed and implemented.

In the distributed storage system 1, one piece of data (file, divided original file, and original data) may be divided, and distributed and stored in two or more storage nodes 10 among the plurality of storage nodes 10-1 to 10-4.

In the example illustrated below, an example of managing moving image data in the distributed storage system 1 is illustrated. That is, an example in which the data (original data and divided original file) is moving image data (moving image file) is illustrated.

[Host Device 30]

The host device 30 is, for example, an information processing device such as a personal computer. The host device 30 issues a read or write request (read/write request) for data (file) stored in the storage node 10 in accordance with an input operation by a user, for example. The read/write request issued from the host device 30 is transmitted to the management node 20.

In the example illustrated in FIG. 1, the distributed storage system 1 includes one host device 30, but the present disclosure is not limited thereto, and may include two or more host devices 30.

Further, the host device 30 issues a neighborhood processing execution request to the management node 20 in accordance with an input operation by the user, for example. The host device 30 transmits to the management node 20, for example, a neighborhood processing execution request including a file name for identifying processing target moving image data (original data and divided original file), processing target frames (target_frames), and a script for neighborhood processing.

For example, in the case of analyzing the moving image data that appears in the image in a specific time zone, the information indicating the time zone for an analysis target corresponds to the processing target frames (target_frames). The processing target frames (target_frames) indicate a data range for which the user of the host device 30 wants to perform the neighborhood processing. Further, a script for extracting the content illustrated in the image corresponds to a script for neighborhood processing. The neighborhood processing execution request corresponds to the processing request for the divided file.

The user operates the host device 30 to input a processing request for the divided original file (moving image data). The processing request is, for example, a script execution request for a moving image, and may be accompanied by an input for specifying a data range (processing target frames) for which the user wants to process in the moving image data.

[Management Node 20]

The management node 20 is, for example, an information processing device having a server function. The management node 20 controls storage (storing and holding) and reading of data (file) for the plurality of storage nodes 10 included in the present distributed storage system 1.

One of the plurality of storage nodes 10 included in the distributed storage system 1 of the first embodiment functions as the management node 20. Any storage node 10 may be in charge of the management node 20. Further, from the viewpoint of distributed processing, it is desirable that the storage node 10 in charge of the management node 20 be regularly or irregularly replaced. For example, at the timing of activation of the distributed storage system 1, a storage node 10 different from the previous management node 20 may function as a new management node 20.

As illustrated in FIG. 2, the management node 20 has functions as a distributed file management unit 201 and a neighborhood processing management unit 202.

The distributed file management unit 201 divides the data into a plurality of pieces of data (files) to distribute and store the created plurality of pieces of data (hereinafter, sometimes referred to as divided data) to the plurality of storage nodes 10 of the distributed storage system 1. In the following, an example in which the distributed storage system 1 is a distributed object storage system that handles divided data as a file will be described. Hereinafter, the divided data may be referred to as a divided file. Further, the undivided file that is the source of a plurality of divided files may be referred to as a divided original file.

For example, when a divided original file is moving image data, a plurality of divided files created by dividing the divided original file may include moving image data in different time zones.

Further, the distributed file management unit 201 has a function of managing divided files stored in each storage node 10. For example, the distributed file management unit 201 manages divided file management information (not illustrated) that associates identification information (divided file ID) for identifying a divided file with the storage position of the divided file in the present distributed storage system 1. The divided file management information may include information indicating the data stored in the divided file.

The distributed file management unit 201 may grasp which divided file is stored in which storage device 40 of which storage node 10 by referring to this divided file management information.

For example, when the distributed file management unit 201 receives a data access request for a divided original file from the host device 30, the distributed file management unit 201 refers to the divided file management information to identify the divided file to be a data access target. Then, the distributed file management unit 201 may cause the storage node 10 that stores the divided file to execute the requested data access.

Further, the distributed file management unit 201 may combine the distributed files stored in a distributed manner in the plurality of storage nodes 10 to generate a divided original file.

The function as the distributed file management unit 201 as described above may be realized by using various known methods, and detailed description thereof will be omitted.

Further, the distributed file management unit 201 stores information (offset) indicating the position in the divided original file for each created divided file. The offset is position information (relative position information) indicating the relative position of the divided file in the divided original file (original data). The offset indicates, for example, the distance (data length) from the beginning of the divided original file to the beginning of the divided file. The unit of an offset is, for example, byte.

Figure 3:
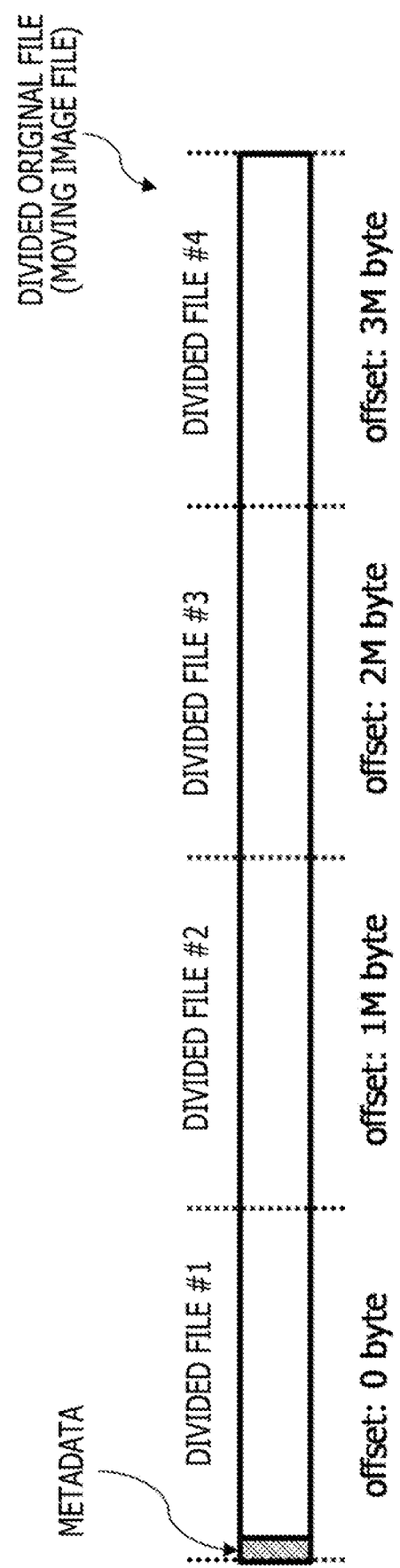
FIG. 3 is a diagram illustrating divided files and offsets in the distributed storage system as an example of the first embodiment.

FIG. 3 is a diagram illustrating divided files and offsets in the distributed storage system 1 as an example of the first embodiment.

FIG. 3 illustrates an example in which the divided original file is divided into four divided files. Further, these four divided files are indicated by reference symbols #1 to #4 in order from the beginning to the end of the divided original file.

Each of the four divided files #1 to #4 has a fixed length of 1 MB, and the beginning position (data length) of each divided file is represented by an offset with respect to the beginning position of the divided original file.

For example, the offset of the divided file #1 is 0, and the offsets of the divided file #2, the divided file #3, and the divided file #4 are 1M, 2M, and 3M.

The distributed file management unit 201 records the offset value of each of these divided files at a predetermined position (for example, a header portion) in each divided file.

Further, in the divided original file illustrated in FIG. 3, metadata is included at the beginning of the divided file #1. In the distributed storage system 1 of the first embodiment, the metadata of the moving image file includes reproduction information used to reproduce the moving image file (divided original file). The reproduction information includes, for example, a decoding rule for reproducing the moving image file and information (reproduction target position information) indicating the position of the data to be reproduced in the moving image file (divided original file). The reproduction information of the metadata corresponds to management information (attribute information) used to reproduce the moving image data.

When receiving an inquiry from the metadata acquisition unit 204, which will be described later, about the storage node 10 that stores the metadata for reproducing the divided file, the distributed file management unit 201 refers to the divided file management information to identify the storage node 10 that stores the metadata of the divided original file of the divided file. In the example illustrated in FIG. 3, the distributed file management unit 201 notifies the metadata acquisition unit 204 of information specifying the storage node 10 that stores the divided file #1 including metadata, as metadata position information.

The neighborhood processing management unit 202 realizes neighborhood processing that causes the storage node 10 that stores the divided file to execute the processing for the divided file.

As illustrated in FIG. 2, the neighborhood processing management unit 202 has the functions of the metadata acquisition unit 204 and a node determination unit 203.

The metadata acquisition unit 204 acquires metadata (reproduction information) for reproducing the divided file that is a target of neighborhood processing by the storage node 10 (hereinafter, sometimes referred to as a processing target divided file). The metadata acquisition unit 204 inquires of the distributed file management unit 201 about the storage node 10 that stores the metadata of the divided original file of the processing target divided file. Then, the metadata acquisition unit 204 transmits, via the network 50, a metadata request notification requesting transmission of metadata to the storage node 10 specified by the response from the distributed file management unit 201 to this inquiry. The metadata request notification may include, for example, identification information (divided file ID) for identifying a divided file including metadata.

The metadata acquisition unit 204 receives the metadata transmitted from the storage node 10 in response to this metadata request notification. The metadata acquisition unit 204 stores the received metadata in a predetermined storage area such as a storage device 40, the memory 12, a storage device 13 (see FIG. 12), or the like.

The node determination unit 203 determines the storage node 10 that executes the neighborhood processing based on the neighborhood processing execution request received from the host device 30. Hereinafter, the storage node 10 that executes the neighborhood processing may be referred to as the neighborhood processing execution node 10.

The node determination unit 203 notifies the distributed file management unit 201 of, for example, the processing target frames (target_frames) included in the neighborhood processing execution request. The distributed file management unit 201 refers to the divided file management information to identify which divided file includes the processing target frames and where in the storage device 40 of which storage node 10 the processing target frames are stored. The distributed file management unit 201 responds to the node determination unit 203 with the storage node 10 that stores the divided files corresponding to the processing target frames.

The node determination unit 203 determines the storage node 10 returned from the distributed file management unit 201 as the neighborhood processing execution node 10.

The node determination unit 203 transmits the metadata of the divided original file including the processing target frames to the determined neighborhood processing execution node 10 and instructs creation of partial reproduction data. Details of the partial reproduction data will be described later.

Further, the node determination unit 203 transmits a script for neighborhood processing to be executed to the neighborhood processing execution node 10 to instruct the neighborhood processing execution.

The neighborhood processing management unit 202 receives the result of the executed neighborhood processing from the neighborhood processing execution node 10, and responds to the host device 30 that is the request source of the neighborhood processing.

[Storage Node 10]

The storage node 10 is an information processing device that includes the storage device 40, and is a storage control device that controls reading and writing of data with respect to the storage device 40. The storage node 10 causes the storage device 40 to store the divided files.

In the example illustrated in FIG. 1, the storage node 10-1 may be represented as node #1, the storage node 10-2 as node #2, the storage node 10-3 as node #3, and the storage node 10-4 as node #4.

The storage node 10 may receive the divided file from the management node 20, store the same in a predetermined storage area in the storage device 40, and notify the management node 20 (distributed file management unit 201) of information indicating the storage position (address and the like). In addition, the storage node 10 may store the divided file received from the management node 20 in the storage area in the storage device 40 specified by the management node 20 (distributed file management unit 201).

Further, the storage node 10 receives the metadata, the partial reproduction data creation instruction, and the script for neighborhood processing transmitted from the node determination unit 203 of the management node 20, and stores the same in the storage device 40 and the memory 12 (see FIG. 12), respectively.

As illustrated in FIG. 2, the storage node 10 has functions as a partial reproduction data creation unit 101, a data transmission unit 104, and a neighborhood processing execution unit 105.

Upon receiving the metadata request notification from the management node 20, the data transmission unit 104 extracts the metadata from the divided file identified by the divided file ID included in the metadata request notification and transmits the metadata to the management node 20, for example.

The partial reproduction data creation unit 101 creates partial reproduction data based on the partial reproduction data creation instruction transmitted from the node determination unit 203 of the management node 20. The partial reproduction data is created based on one divided file, and the divided file may be reproduced alone.

The partial reproduction data creation unit 101 includes a data acquisition unit 102 and a dummy area setting unit 103.

The data acquisition unit 102 acquires data for creating partial reproduction data. The data acquisition unit 102 acquires metadata for reproducing a divided file. The data acquisition unit 102 may acquire the metadata by receiving the metadata transmitted from the node determination unit 203 of the management node 20.

Further, instead of receiving the metadata from the management node 20, the data acquisition unit 102 may acquire the metadata from another storage node 10 that stores the metadata. For example, the data acquisition unit 102 may grasp the storage position of the metadata by inquiring the distributed file management unit 201 of the management node 20 about the storage node that stores the metadata of the divided original file in the present distributed storage system 1. The data acquisition unit 102 may acquire metadata by making a metadata transmission request to the storage node 10 that stores the metadata.

The dummy area setting unit 103 sets a dummy area in the partial reproduction data. Details of the processing by the dummy area setting unit 103 will be described later.

Figure 4:
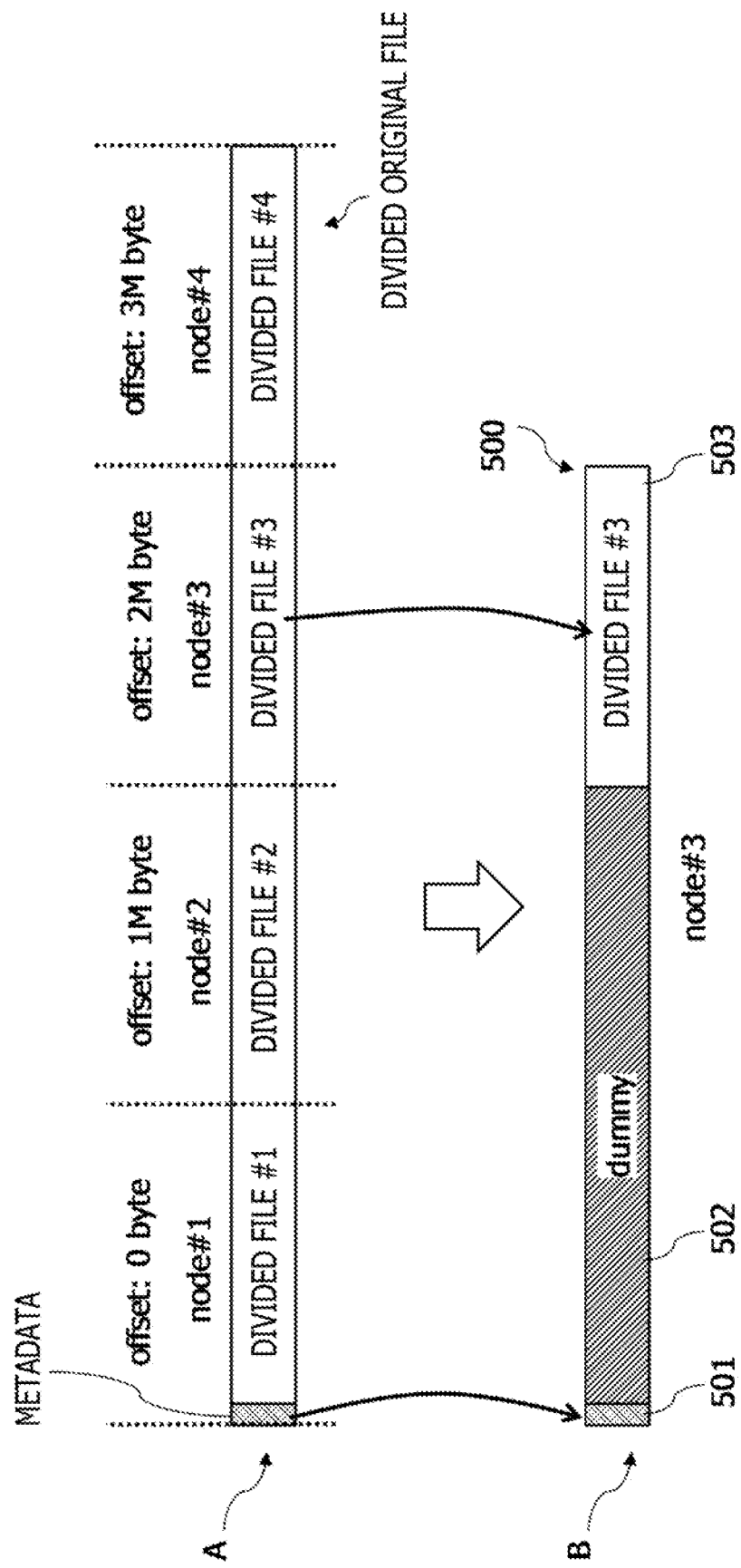
FIG. 4 is a diagram illustrating partial reproduction data in the distributed storage system as an example of the first embodiment.

FIG. 4 is a diagram illustrating partial reproduction data in the distributed storage system 1 as an example of the first embodiment.

In FIG. 4, reference symbol A indicates an example in which the divided original file is divided to create four divided files #1 to #4, as in FIG. 3. Each of the four divided files #1 to #4 has a fixed length of 1 MB, and the beginning position (distance and data length) of each divided file is represented by an offset with respect to the beginning of the divided original file. The offset of the divided file #1 is 0, and the offsets of the divided file #2, the divided file #3, and the divided file #4 are 1M, 2M, and 3M.

Then, the storage node 10-1 (node #1) stores the divided file #1, the storage node 10-2 (node #2) stores the divided file #2, the storage node 10-3 (node #3) stores the divided file #3, and the storage node 10-4 (node #4) stores the divided file #4.

That is, the storage node 10-1 (node #1) performs neighborhood processing on the divided file #1. Similarly, the storage node 10-2 (node #2) performs neighborhood processing on the divided file #2, the storage node 10-3 (node #3) performs neighborhood processing on the divided file #3, and the storage node 10-4 (node #4) performs neighborhood processing on the divided file #4.

In FIG. 4, reference symbol B illustrates the partial reproduction data created based on the divided file #3, as an example.

That is, FIG. 4 illustrates an example in which the storage node 10-3 (node #3) is the neighborhood processing execution node 10. Hereinafter, the storage node 10-3, which is the neighborhood processing execution node 10, may be represented as a neighborhood processing execution node 10-3.

Hereinafter, the partial reproduction data is illustrated with reference symbol 500. As illustrated in FIG. 4, the partial reproduction data 500 includes a metadata section 501, a dummy data section 502, and a divided file section 503.

As illustrated in FIG. 4, in the partial reproduction data 500, the metadata section 501 is provided at the beginning thereof, the dummy data section 502 is provided at a position subsequent to the metadata section 501, and the divided file section 503 is provided at a position subsequent to the dummy data section 502.

The metadata read out from the divided original file is stored in the metadata section 501. The position (distance from the beginning) of the metadata section 501 in the partial reproduction data 500 is equal to the position (distance from the beginning) of the metadata read in the divided original file. In the example illustrated in FIG. 4, the metadata read from the beginning position of the divided file #1 is stored in the metadata section 501 located at the same (equal distance) position (beginning position) with respect to the beginning of the divided original file in the partial reproduction data 500.

The metadata section 501 corresponds to a first area corresponding to the position of the metadata in the divided original file.

The metadata section 501 stores the metadata transmitted from the node determination unit 203 of the management node 20 before and after the partial reproduction data creation instruction. This metadata includes a decoding rule used for reproducing the divided file and information indicating the storage position of the reproduction target data.

The divided files are stored in the divided file section 503. The divided file is created by the distributed file management unit 201 of the management node 20, and is stored in, for example, the storage device 40 of the neighborhood processing execution node 10.

The position (distance from the beginning) of the divided file section 503 in the partial reproduction data 500 is equal to the position (distance from the beginning) of the divided file in the divided original file. In the example illustrated in FIG. 4, the divided file #3 is stored in the divided file section 503 located at the same (equal distance) positions with respect to the beginning of the divided original file in the partial reproduction data 500.

The divided file section 503 corresponds to a second area corresponding to the relative position of the divided data in the divided original file.

The dummy area setting unit 103 sets the dummy section (dummy area) 502 in an area other than the metadata section 501 and the divided file section 503 in the partial reproduction data 500.

Dummy data is set in the dummy data section 502. The dummy data section 502 has a data size obtained by subtracting the size of the metadata section 501 from the offset size of the divided file stored in the divided file section 503.

The dummy data section 502 corresponds to a third area other than the metadata section 501 (first area) and the divided file section 503 (second area).

By providing the dummy data section 502 in the partial reproduction data 500, positioning is performed so that the beginning position of the divided file section 503 subsequent to the dummy data section 502 is the same as the offset value of the divided file stored in the divided file section 503.

The position of the divided file of the divided file section 503 in the partial reproduction data 500 (distance from the beginning of the partial reproduction data 500) is the same as the position of the divided file in the divided original file (distance from the beginning of the divided original file). As a result, the divided file stored in the divided file section 503 may be reproduced by using the information indicating the storage position of the reproduction target data of the metadata included in the metadata section 501.

For example, the dummy data of the dummy data section 502 may be configured by filling continuous "0" or "1", or may be configured as a combination of "0" and "1" having a specific pattern, and may be appropriately changed and implemented.

It may be said that in the partial reproduction data 500, the dummy data section 502 is formed so as to fill the space between the positions of the divided file section 503 and a plurality of pieces of metadata sections 501. That is, the partial reproduction data creation unit 101 inserts dummy data between the divided file and the metadata to create the partial reproduction data.

The partial reproduction data 500 has a divided file and also has metadata used for reproducing the divided file. Then, dummy data is inserted between the metadata and the divided original file so that the position of the divided file in the partial reproduction data 500 is the same as the position of the divided file in the divided original file. As a result, the partial reproduction data 500 is configured as one independently reproducible file (moving image file and divided data reproduction data).

The neighborhood processing execution unit 105 performs neighborhood processing on the partial reproduction data created by the partial reproduction data creation unit 101. The neighborhood processing execution unit 105 executes the neighborhood processing by executing the script transmitted together with the execution instruction of the neighborhood processing from the node determination unit 203 of the management node 20 on the partial reproduction data.

The execution of the script for the partial reproduction data may be realized in the same manner as a known method for executing the script for the moving image data, and the description thereof will be omitted.

The neighborhood processing execution unit 105 transmits the execution result of the script for the partial reproduction data to the management node 20 (neighborhood processing management unit 202) as the execution result of the neighborhood processing.

(B) Operation

The neighborhood processing in the distributed storage system 1 as an example of the first embodiment configured as described above will be described according to the sequence diagram illustrated in FIG. 5.

Figure 5:
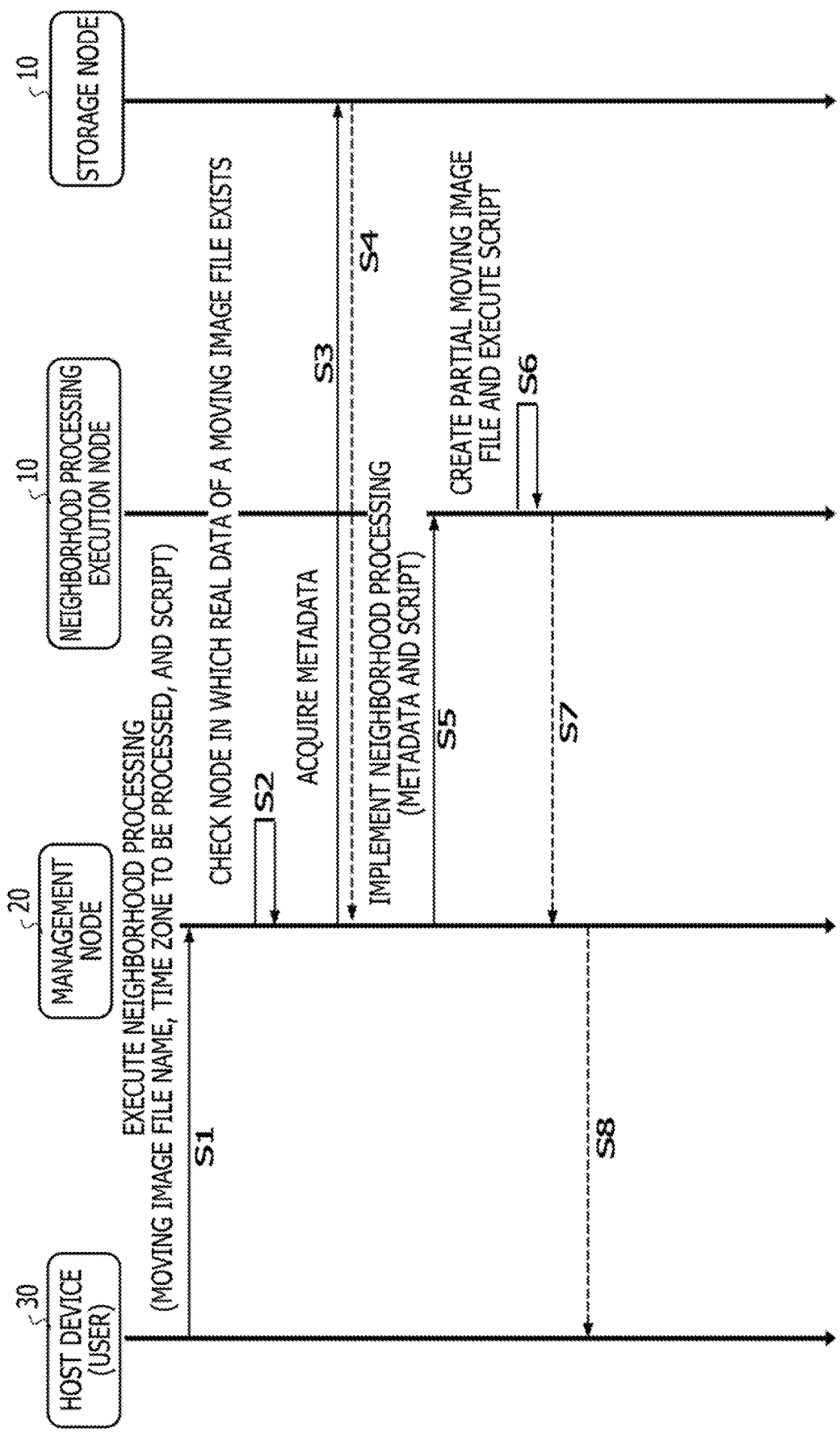
FIG. 5 is a sequence diagram illustrating neighborhood processing in the distributed storage system as an example of the first embodiment.

In the example illustrated in FIG. 5, the host device 30, the management node 20, the neighborhood processing execution node 10, and the storage node 10 other than the neighborhood processing execution node 10 are illustrated.

When the user inputs a neighborhood processing instruction in the host device 30, the host device 30 transmits to the management node 20 a neighborhood processing execution request including a file name for identifying a processing target moving image (divided original file), processing target frames (target_frames), and a script for neighborhood processing (see arrow S1). In addition, the processing target frames corresponds to the time zone to be the target of the neighborhood processing in the moving image file.

In the management node 20, the node determination unit 203 notifies the distributed file management unit 201 of, for example, the processing target frames (target_frames) included in the neighborhood processing execution request. The distributed file management unit 201 refers to the divided file management information based on the moving image file name to check the storage node 10 that stores the divided file (processing target divided file) including the frames (target_frames), and notifies the node determination unit 203 of the storage node (neighborhood processing execution node) 10. The node determination unit 203 determines the storage node 10 returned from the distributed file management unit 201 as the neighborhood processing execution node 10 (see arrow S2).

In the management node 20, the metadata acquisition unit 204 inquires of the distributed file management unit 201 about the storage node 10 that stores the metadata of the divided original file. The distributed file management unit 201 refers to the divided file management information to identify the storage node 10 that stores the metadata, and responds to the metadata acquisition unit 204 with the metadata position information.

The metadata acquisition unit 204 transmits a metadata request notification requesting transmission of metadata to the storage node 10 specified by the metadata position information returned from the distributed file management unit 201 (see arrow S3).

The storage node 10 that has received the metadata request notification responds to the management node 20 with the metadata of the divided original file stored in the own storage device 40 thereof (see arrow S4).

In the management node 20, the node determination unit 203 transmits the metadata of the divided original file including the processing target frames to the neighborhood processing execution node 10 and instructs creation of partial reproduction data. The node determination unit 203 transmits a script for the neighborhood processing to be executed to the neighborhood processing execution node 10 to instruct the neighborhood processing execution (see arrow S5).

In the neighborhood processing execution node 10, the partial reproduction data creation unit 101 creates partial reproduction data based on the partial reproduction data creation instruction transmitted from the node determination unit 203 of the management node 20. Further, in the neighborhood processing execution node 10, the neighborhood processing execution unit 105 executes the neighborhood processing by executing the script transmitted together with the execution instruction of the neighborhood processing from the node determination unit 203 of the management node 20 on the created partial reproduction data (see arrow S).

The neighborhood processing execution unit 105 of the neighborhood processing execution node 10 transmits the execution result of the script for the partial reproduction data to the management node 20 (neighborhood processing management unit 202) as the execution result of the neighborhood processing (see arrow S7). The management node 20 transmits the execution result of the neighborhood processing to the host device 30 (see arrow S8).

(C) Effect

According to the distributed storage system 1 as an example of the first embodiment, in the neighborhood processing execution node 10, the partial reproduction data creation unit 101 creates the partial reproduction data 500 including the metadata and the divided file. As a result, the divided file may be reproduced in the neighborhood processing execution node 10, and the neighborhood processing may be executed on the divided file.

Further, at this time, only the metadata having a small size of data to be exchanged with another storage node 10 or the management node 20 via the network 50, and the amount of data to be transferred in the network 50 may be reduced.

The partial reproduction data creation unit 101 creates the partial reproduction data 500. The partial reproduction data 500 has the metadata section 501 at the beginning thereof, the dummy data section 502 at a position subsequent to the metadata section 501, and the divided file section 503 at a position subsequent to the dummy data section 502.

By providing the metadata section 501 with metadata for reproducing the divided file stored in the divided file section 503, in the partial reproduction data 500 alone, any frame of the divided file included in the divided file section 503 in the partial reproduction data 500 may be reproduced.

The dummy data section 502 includes dummy data having a data size obtained by subtracting the size of the metadata section 501 from the offset size of the divided file stored in the divided file section 503. As a result, the position of the divided file of the divided file section 503 in the partial reproduction data 500 (distance from the beginning of the partial reproduction data 500) is the same as the position of the divided file in the divided original file (distance from the beginning of the original file). That is, the divided file stored in the divided file section 503 may be reproduced by using the information indicating the storage position of the reproduction target data of the metadata included in the metadata section 501 as it is.

(II) Description of Second Embodiment

In the above-described first embodiment, the example in which the metadata is stored at the beginning of the divided original file has been described, but for example, in the moving image file (divided original file), the position of the metadata is not limited to the beginning of the moving image file.

(A) Configuration

Figure 6:
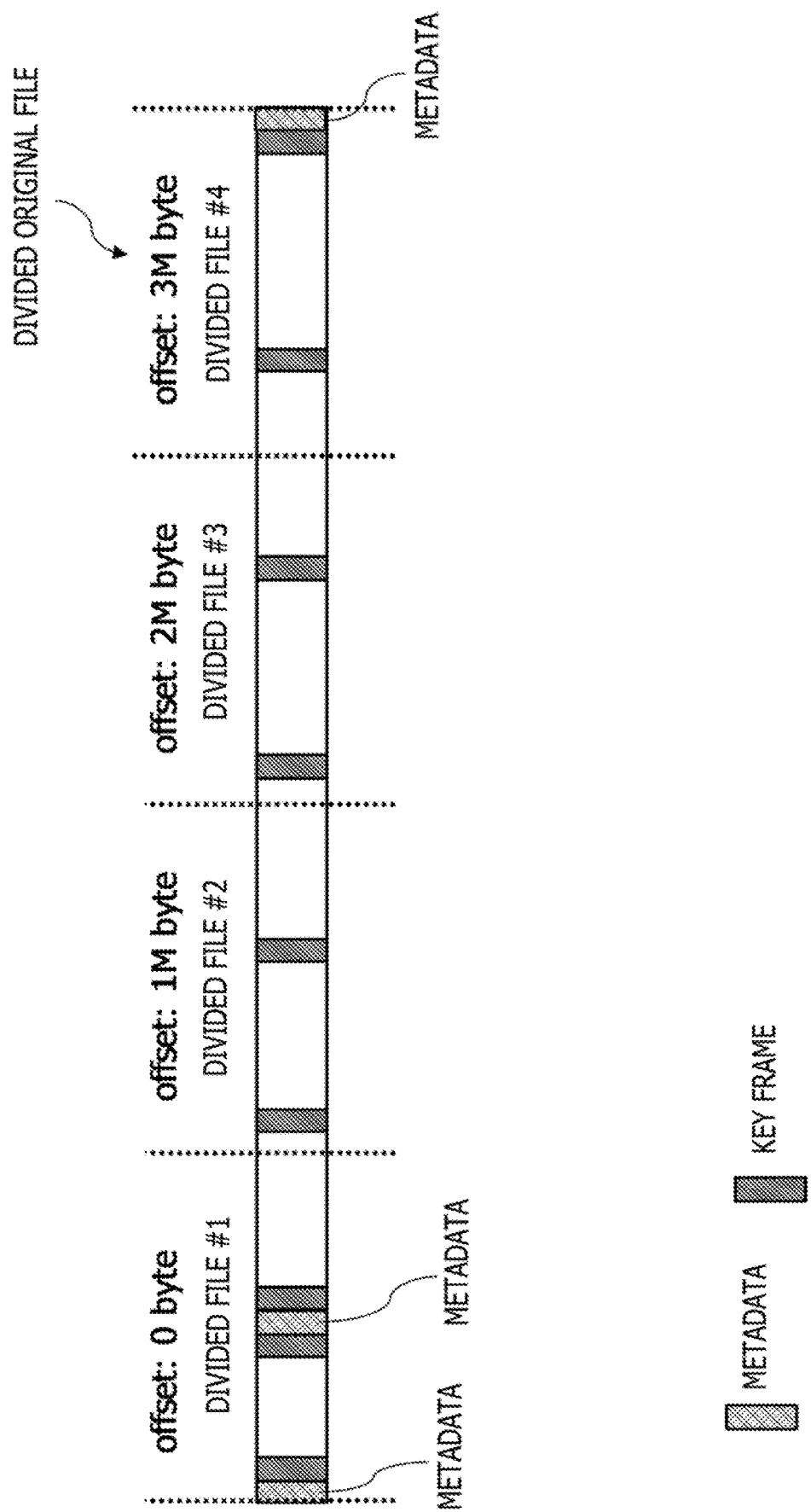
FIG. 6 is a diagram illustrating a configuration of a divided original file processed in a distributed storage system as an example of a second embodiment.

FIG. 6 is a diagram illustrating a configuration of a divided original file processed in the distributed storage system 1 as an example of a second embodiment.

In the divided original file illustrated in FIG. 6, metadata is also provided at positions other than the beginning. Each piece of metadata provided at a plurality of positions of the divided original file has offset information up to the subsequent metadata, respectively, whereby only the metadata may be sequentially read from the divided original file. The plurality of pieces of metadata included in the divided original file include not only the reproduction information used for reproducing the moving image file as described above, but also the information not directly used for reproducing the moving image.

Further, the divided original file illustrated in FIG. 6 is provided with a plurality of key frames.

The key frames are, for example, frames in which main changes in the moving image are defined. Change points of the shape or position of the object are specified in the key frames, and a smooth moving image may be created by complementing the points. The key frames correspond to management information (control information) used to reproduce moving image data.

In order to reproduce the data in the area sandwiched between two key frames in the moving image data, these key frames and all the data between the key frames are used. Therefore, in order to reproduce the divided file of the moving image data including key frames, not only the divided file but also each piece of data up to the key frames before and after the divided file are used.

Figure 7:
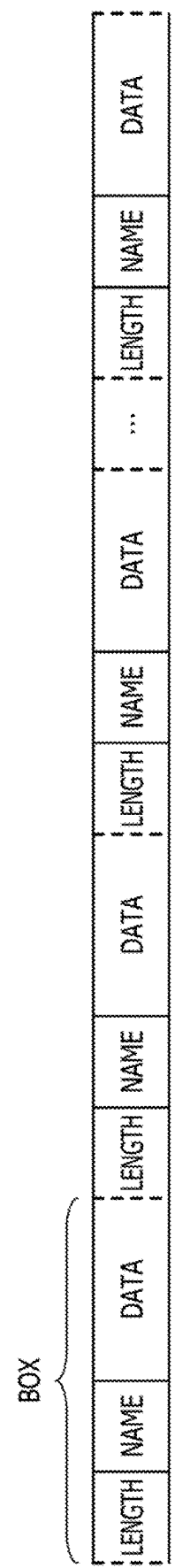
FIG. 7 is a diagram illustrating an example of data structure of an MP4 file.

FIG. 7 is a diagram illustrating the data structure of an MP4 file.

The MP4 file is composed of a series of data blocks called Box. Box has "length", "name", and "data" areas. The data length of the Box is stored in the "length" area, and the name of the Box is stored in the "name" area.

In addition, the information stored in the "name" area of the Box also includes information representing the content of the data stored in the "data" area. Therefore, it is possible to acquire metadata and key frames by referring to the "name" area of the Box. Further, for example, by referring to the "name" area of the Box and reading data as appropriate, or by skipping to the next Box by using the value of the "length" area of the Box, data such as metadata and key frames may be collected with few accesses.

The distributed storage system 1 of the second embodiment has the same hardware configuration as the first embodiment illustrated in FIG. 1. In the drawings, the same reference symbols as those used above denote the same parts, and a description thereof will be omitted.

Figure 8:
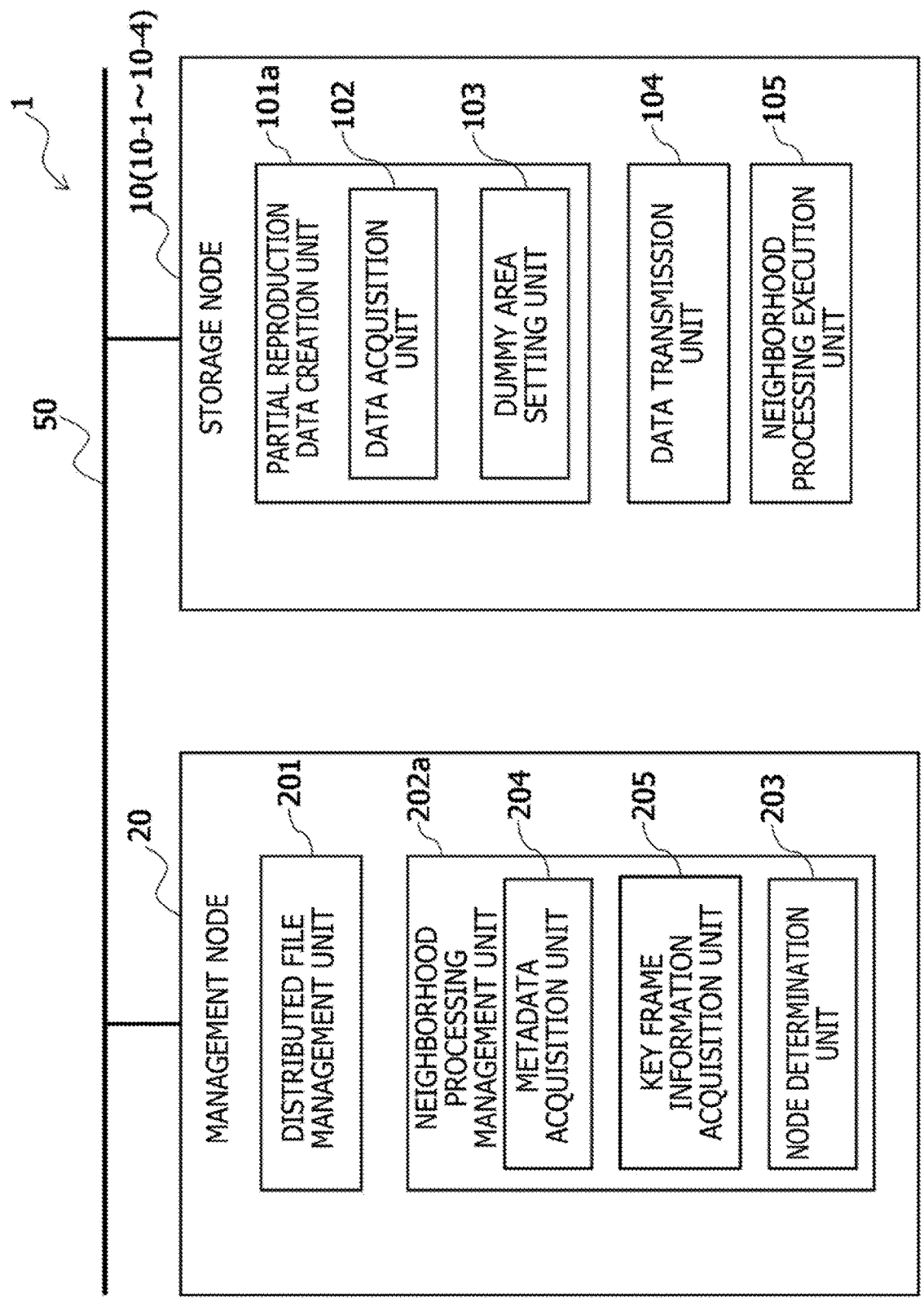
FIG. 8 illustrates a functional configuration of the distributed storage system as an example of the second embodiment.

FIG. 8 illustrates a functional configuration of the distributed storage system 1 as an example of the second embodiment.

For the sake of convenience, FIG. 8 illustrates one of a plurality of storage nodes 10 illustrated in FIG. 1 and a management node 20.

[Management Node 20]

In the distributed storage system 1 of the second embodiment, one storage node 10 of the plurality of storage nodes 10 functions as the management node 20 as in the first embodiment.

Any storage node 10 may be in charge of the management node 20. From the viewpoint of distributed processing, it is desirable that the storage node 10 in charge of the management node 20 be regularly or irregularly replaced. For example, at the timing of activation of the distributed storage system 1, a storage node 10 different from the previous management node 20 may function as a new management node 20.

As illustrated in FIG. 8, the management node 20 has functions as a distributed file management unit 201 and a neighborhood processing management unit 202a.

The neighborhood processing management unit 202a has a function as a key frame information acquisition unit 205 in addition to the function as the neighborhood processing management unit 202 of the first embodiment.

The key frame information acquisition unit 205 acquires the position of the key frame in the divided original file. The key frame information acquisition unit 205 acquires the positions of the key frames at the positions before and after the frames (target_frames) that are the target of the neighborhood processing and input from the host device 30 in the divided original file.

The positions of the key frames in the divided original file may be acquired, for example, by referring to the metadata collected by the metadata acquisition unit 204, and may be variously changed and implemented.

In the divided original file illustrated in FIG. 6, an example in which the divided original file is divided to create four divided files is illustrated. Further, these four divided files are indicated by reference symbols #1 to #4 in order from the beginning to the end of the divided original file.

Each of the four divided files #1 to #4 has a fixed length of 1 MB, and the beginning position of each divided file is represented by an offset with respect to the beginning of the divided original file.

For example, the offset of the divided file #1 is 0, and the offsets of the divided file #2, the divided file #3, and the divided file #4 are 1M, 2M, and 3M.

The distributed file management unit 201 records the offset value of each of these divided files at a predetermined position (for example, a header portion) in each divided file.

Further, in the divided original file illustrated in FIG. 6, metadata is included near the beginning and center of the leading divided file #1. Further, metadata is also included at the end of the divided file #4.

Then, in the example illustrated in FIG. 6, it is assumed that the two pieces of metadata included in the divided file #1 include reproduction information.

When receiving an inquiry from the metadata acquisition unit 204 about the storage node 10 that stores the metadata for reproducing the divided file, the distributed file management unit 201 refers to the divided file management information to identify the storage node 10 that stores the metadata of the divided original file of the divided file. In the example illustrated in FIG. 6, the distributed file management unit 201 notifies the metadata acquisition unit 204 of information specifying the storage node 10 that stores the divided file #1 including metadata with the reproduction information, as metadata position information.

The node determination unit 203 determines the neighborhood processing execution node 10. The node determination unit 203 transmits the metadata of the divided original file including the processing target frames to the determined neighborhood processing execution node 10 and instructs creation of partial reproduction data. The node determination unit 203 may notify the neighborhood processing execution node 10 of the metadata extracted from the divided original file (divided file #1) as well as the metadata storage position in the divided original file. Further, the node determination unit 203 notifies the neighborhood processing execution node 10 of the key frame position preceding the processing target frames and the key frame position subsequent to the processing target frames in the divided file.

[Storage Node 10]

The storage node 10 is an information processing device that includes the storage device 40, and is a storage control device that controls reading and writing of data with respect to the storage device 40. The storage node 10 causes the storage device 40 to store the divided files.

In the example illustrated in FIG. 1, the storage node 10-1 may be represented as node #1, the storage node 10-2 as node #2, the storage node 10-3 as node #3, and the storage node 10-4 as node #4.

As illustrated in FIG. 8, the storage node 10 has functions as a partial reproduction data creation unit 101a, a data transmission unit 104, and a neighborhood processing execution unit 105.

The partial reproduction data creation unit 101a creates partial reproduction data based on the partial reproduction data creation instruction transmitted from the node determination unit 203 of the management node 20. The partial reproduction data is created based on one divided file, and the divided file may be reproduced alone.

The partial reproduction data creation unit 101a includes a data acquisition unit 102 and a dummy area setting unit 103.

In the second embodiment, the data acquisition unit 102 acquires key frames as data for creating partial reproduction data, in addition to metadata. When the divided file does not include a key frame adjacent to the processing target frames, the data acquisition unit 102 acquires insufficient data from the end position of the processing target frames to the adjacent key frame from another divided file adjacent to the divided file. Details of the processing by the data acquisition unit 102 will be described later.

Figure 9:
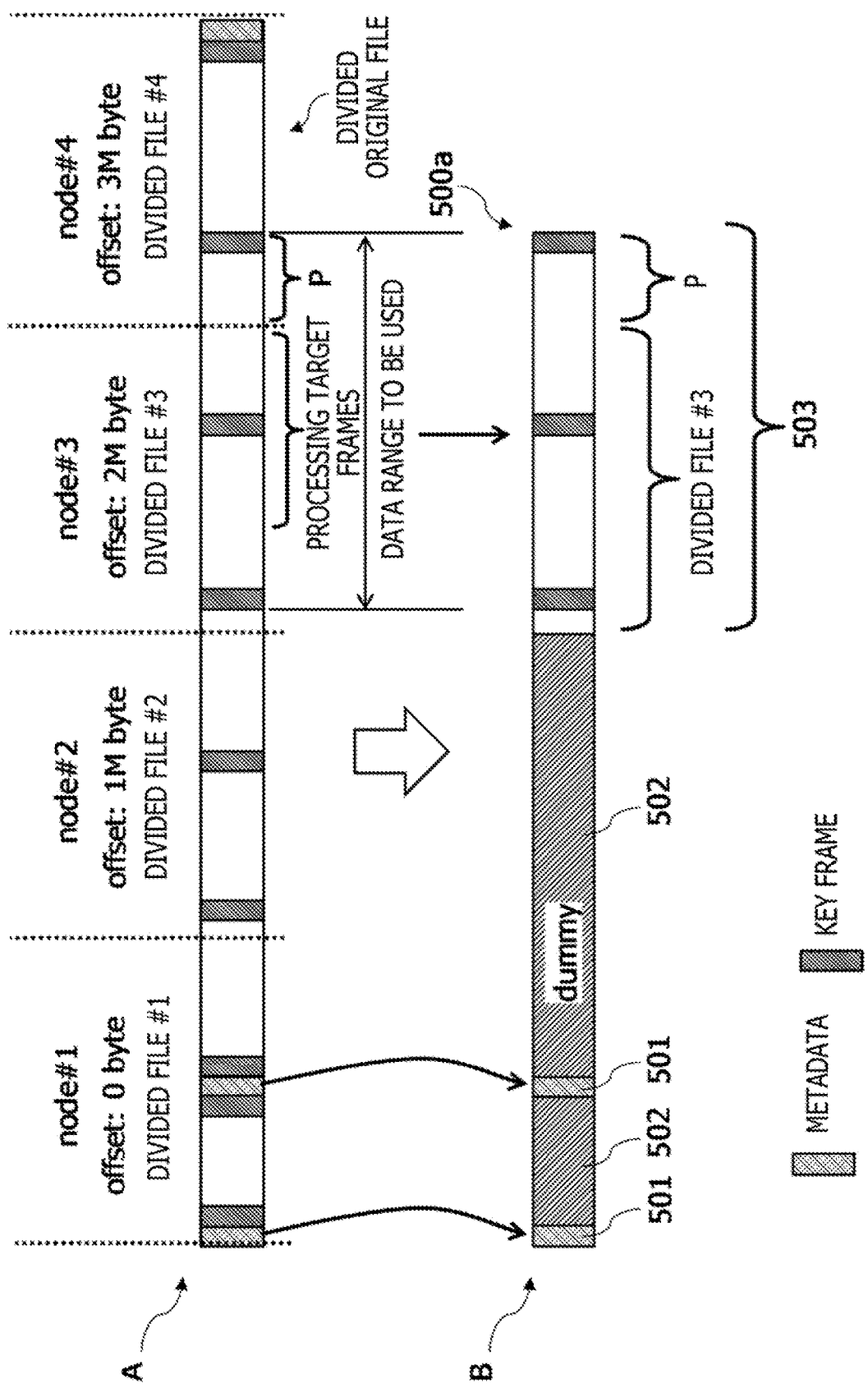
FIG. 9 is a diagram illustrating partial reproduction data in the distributed storage system as an example of the second embodiment.

FIG. 9 is a diagram illustrating partial reproduction data in the distributed storage system 1 as an example of the second embodiment.

In FIG. 9, reference symbol A indicates an example in which the divided original file is divided to create four divided files #1 to #4. Each of the four divided files #1 to #4 has a fixed length of 1 MB, and the beginning position (data length) of each divided file is represented by an offset with respect to the beginning of the divided original file. The offset of the divided file #1 is 0, and the offsets of the divided file #2, the divided file #3, and the divided file #4 are 1M, 2M, and 3M.

Then, the storage node 10-1 (node #1) stores the divided file #1, the storage node 10-2 (node #2) stores the divided file #2, the storage node 10-3 (node #3) stores the divided file #3, and the storage node 10-4 (node #4) stores the divided file #4.

That is, the storage node 10-1 (node #1) performs neighborhood processing on the divided file #1. Similarly, the storage node 10-2 (node #2) performs neighborhood processing on the divided file #2, the storage node 10-3 (node #3) performs neighborhood processing on the divided file #3, and the storage node 10-4 (node #4) performs neighborhood processing on the divided file #4.

In FIG. 9, reference symbol B illustrates the partial reproduction data created based on the divided file #3, as an example.

That is, FIG. 9 illustrates an example in which the storage node 10-3 (node #3) is the neighborhood processing execution node 10. Hereinafter, the storage node 10-3, which is the neighborhood processing execution node 10, may be represented as a neighborhood processing execution node 10-3.

Hereinafter, the partial reproduction data in the distributed storage system 1 according to the present second embodiment will be illustrated with reference symbol 500*a*. Partial reproduction data 500*a* includes the metadata section 501, the dummy data section 502, and the divided file section 503.

As illustrated in FIG. 9, the metadata section 501 is provided at a plurality of positions (two in the example illustrated in FIG. 9) in the partial reproduction data 500*a* including the beginning thereof, the dummy data section 502 is provided at each position before and after these metadata sections 501, and the divided file section 503 is provided at a position subsequent to the dummy data section 502.

The metadata read out from the divided original file is stored in the metadata section 501. The position (distance from the beginning) of the metadata section 501 in the partial reproduction data 500*a* is equal to the position (distance from the beginning) of the metadata read in the divided original file. In the example illustrated in FIG. 9, two pieces of metadata read from the divided file #1 are stored in the metadata section 501 located at the same (equal distance) positions with respect to the beginning of the divided original file in the partial reproduction data 500*a*.

The divided files are stored in the divided file section 503. The divided file is created by the distributed file management unit 201 of the management node 20, and is stored in, for example, the storage device 40 of the neighborhood processing execution node 10.

The position (distance from the beginning) of the divided file section 503 in the partial reproduction data 500*a* is equal to the position (distance from the beginning) of the divided file in the divided original file. In the example illustrated in FIG. 9, the divided file #3 is stored in the divided file section 503 located at the same (equal distance) positions with respect to the beginning of the divided original file in the partial reproduction data 500*a*.

Further, the partial reproduction data creation unit 101*a* checks the positions of key frames before and after the processing target frames in the divided file when the divided file is stored in the divided file section 503 of the partial reproduction data 500*a*. Specifically, the partial reproduction data creation unit 101*a* checks whether or not there are key frames at a position ahead of the processing target frames and a position rearward of the processing target frames in the divided file.

When there is no key frame at a position ahead of the processing target frames in the divided file, the data acquisition unit 102 of the partial reproduction data creation unit 101*a* requests the storage node 10 that stores the divided file preceding the processing target divided file to transmit the data from the front end position of the processing target frames to the first (nearest) preceding key frame (data complement request).

Further, when there is no key frame at a position rearward of the processing target frames in the divided file, the data acquisition unit 102 of the partial reproduction data creation unit 101*a* requests the storage node 10 that stores a divided file subsequent to the processing target divided file to transmit data from the rear end position of the processing target frames to the first (nearest) subsequent key frame.

For example, in the divided original file indicated by reference symbol A in FIG. 9, the divided file #3 includes a key frame at a position ahead of the processing target frames, but has no key frame at a position rearward of the processing target frames (see "data range to be used" in FIG. 9).

In such a case, the data acquisition unit 102 of the neighborhood processing execution node 10 requests the storage node 10-4 that manages the divided file #4 subsequent to the divided file #3 to transmit data (see reference symbol P in FIG. 9) from the rear end position of the processing target frames to the first subsequent key frame (data complement request).

Then, the partial reproduction data creation unit 101*a* stores the data and key frames returned from the other storage node 10 in response to the data complement request as described above, side by side at a position subsequent to the divided file in the divided file section 503 of the partial reproduction data creation unit 101*a*.

That is, when the divided file does not include a key frame adjacent to the processing target frames, the partial reproduction data creation unit 101*a* (data acquisition unit 102) acquires insufficient data from the end position of the processing target frames to the adjacent key frame from another divided file adjacent to the divided file.

Then, the partial reproduction data creation unit 101*a* links the acquired data of the insufficient portion to the end of the divided file on the key frame absent side, and stores the same in the divided file section 503 of the partial reproduction data 500*a* together with the partial file.

The metadata section 501 stores the metadata transmitted from the node determination unit 203 of the management node 20 before and after the partial reproduction data creation instruction. This metadata includes a decoding rule used for reproducing the divided file and information indicating the storage position of the reproduction target data.

Dummy data is set in the dummy data section 502. The dummy data section 502 has a data size obtained by subtracting the size of the metadata section 501 from the offset size of the divided file stored in the divided file section 503.

The dummy data section 502 corresponds to a third area other than the metadata section 501 (first area) and the divided file section 503 (second area).

By providing the dummy data section 502 in the partial reproduction data 500*a*, positioning is performed so that the beginning position of the divided file section 503 subsequent to the dummy data section 502 is the same as the offset value of the divided file stored in the divided file section 503.

The position of the divided file of the divided file section 503 in the partial reproduction data 500*a* (distance from the beginning of the partial reproduction data 500*a*) is the same as the position of the divided file in the divided original file (distance from the beginning of the divided original file). As a result, the divided file stored in the divided file section 503 may be reproduced by using the information indicating the storage position of the reproduction target data of the metadata included in the metadata section 501.

For example, the dummy data of the dummy data section 502 may be configured by filling continuous "0" or "1", or may be configured as a combination of "0" and "1" having a specific pattern, and may be appropriately changed and implemented.

It may be said that in the partial reproduction data 500*a*, the dummy data section 502 is formed so as to fill the space between the positions of the divided file section 503 and the plurality of metadata sections 501. That is, the partial reproduction data creation unit 101*a* inserts dummy data between the divided file and the metadata to create the partial reproduction data.

The partial reproduction data 500a has a divided file and also has metadata used for reproducing the divided file. Then, dummy data is inserted between the metadata and the divided original file so that the position of the divided file in the partial reproduction data 500a is the same as the position of the divided file in the divided original file. Thereby, the partial reproduction data is configured as one file management unit 201 (moving image file) that may be reproduced independently.

Further, when processing target frames span the plurality of divided files, each of the storage nodes 10 storing the respective divided files executes the neighborhood processing on the divided files stored therein as the neighborhood processing execution node 10.

Figure 10:
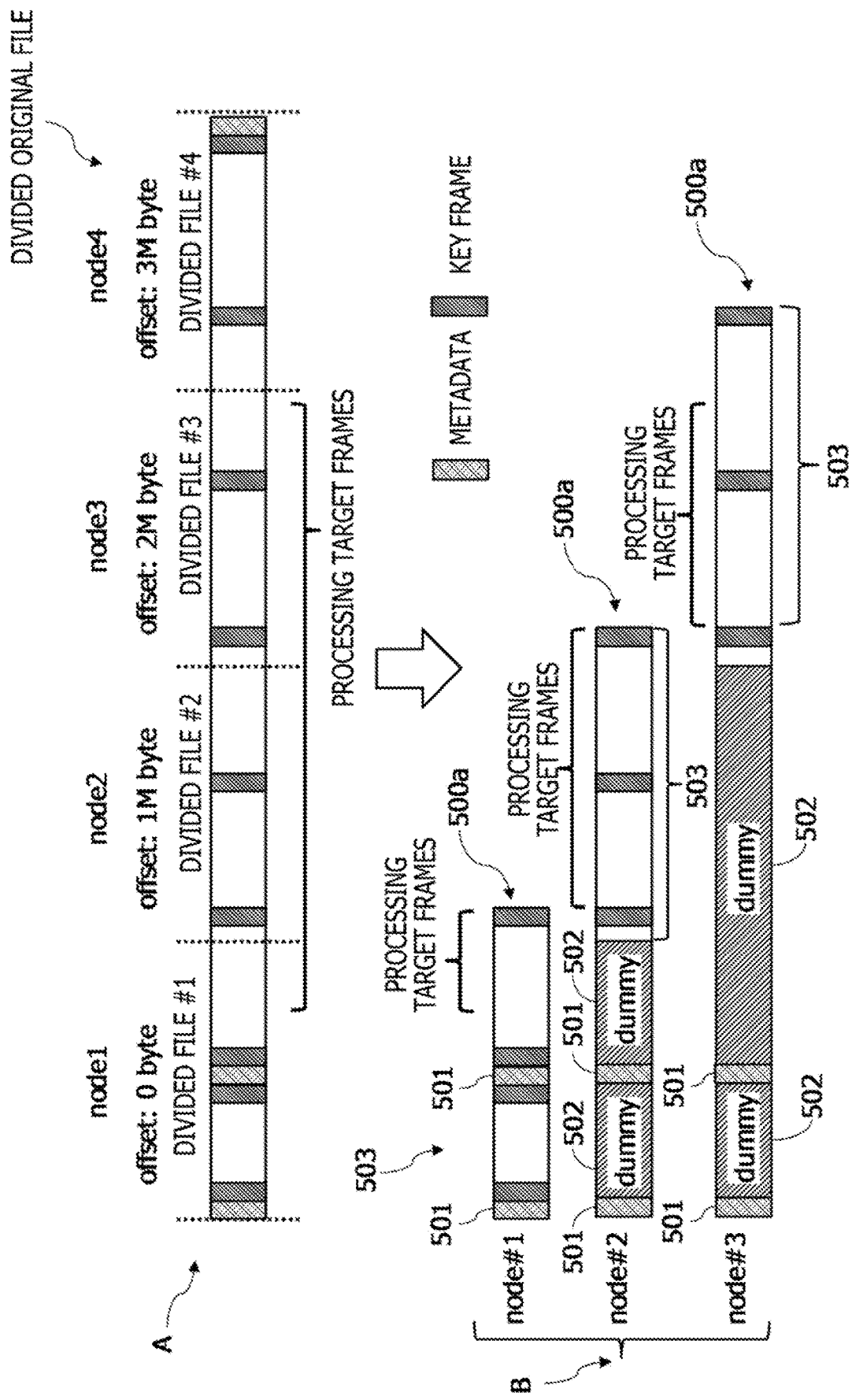
FIG. 10 is a diagram illustrating partial reproduction data in the distributed storage system as an example of the second embodiment.

FIG. 10 is a diagram illustrating partial reproduction data in the distributed storage system 1 as an example of the second embodiment.

In FIG. 10, reference symbol A indicates an example in which the divided original file is divided into four divided files #1 to #4. It is assumed that each of the four divided files #1 to #4 has a fixed length of 1 MB, and the beginning position (distance) of each divided file is represented by an offset with respect to the beginning of the divided original file. The offset of the divided file #1 is 0, and the offsets of the divided file #2, the divided file #3, and the divided file #4 are 1M, 2M, and 3M.

Then, the storage node 10-1 (node #1) stores the divided file #1, the storage node 10-2 (node #2) stores the divided file #2, the storage node 10-3 (node #3) stores the divided file #3, and the storage node 10-4 (node #4) stores the divided file #4.

That is, the storage node 10-1 (node #1) performs neighborhood processing on the divided file #1. Similarly, the storage node 10-2 (node #2) performs neighborhood processing on the divided file #2, the storage node 10-3 (node #3) performs neighborhood processing on the divided file #3, and the storage node 10-4 (node #4) performs neighborhood processing on the divided file #4.

Then, in the example illustrated in FIG. 10, it is assumed that a continuous area from the middle of the divided file #1 to the divided file #3 is specified as the processing target frames (target_frames).

In the distributed storage system 1 according to the second embodiment, the storage nodes 10-1 to 10-3 (storage nodes #1 to #3) corresponding to the respective divided files #1 to #3 respectively create the partial reproduction data 500a and execute the neighborhood processing.

In FIG. 10, reference symbol B indicates the partial reproduction data 500a created by the storage nodes 10-1 (node #1), 10-2 (node #2), and 10-3 (node #3), respectively.

That is, FIG. 10 illustrates an example in which the storage nodes 10-1 (node #1), 10-2 (node #2), and 10-3 (node #3) are the neighborhood processing execution nodes 10, respectively. Hereinafter, the storage nodes 10-1 to 10-3, which are the neighborhood processing execution nodes 10, may be referred to as the neighborhood processing execution nodes 10-1 to 10-3 or the neighborhood processing execution node 10.

In the management node 20, the neighborhood processing management unit 202a divides the processing target frames (target_frames) into a plurality (three in the present example) of divided frames (split_frames{1, 2, 3}) to be reproduced by each of the neighborhood processing execution nodes 10-1 to 10-3, based on the information of the key frames.

The node determination unit 203 of the management node 20 transmits the metadata for reproducing the moving image data and the information of the key frames before and after each divided frame to the neighborhood processing execution node 10. Each neighborhood processing execution node 10 executes neighborhood processing based on these pieces of information.

In the neighborhood processing execution node 10-1 (node #1), the partial reproduction data creation unit 101a creates the partial reproduction data 500a based on the divided file #1. The divided file #1 illustrated in FIG. 10 is provided with two pieces of metadata having reproduction information.

Further, there is a key frame at a position ahead of the processing target frames in the divided file #1, but there is no key frame at a position rearward of the processing target frames. The partial reproduction data creation unit 101a of the neighborhood processing execution node 10-1 requests the storage node 10-2 that stores the divided file #2 subsequent to this divided file #1 to transmit data from the rear end position of the processing target frames to the first (nearest) preceding key frame (data complement request). As a result, the partial reproduction data creation unit 101a of the neighborhood processing execution node 10-1 acquires data that is insufficient for reproduction of the processing target frames in the divided file #1, from the storage node 10-2.

The partial reproduction data creation unit 101a of the neighborhood processing execution node 10-1 stores the data and the key frames returned from the other storage node 10 in response to the data complement request, side by side at a position subsequent to the divided file #1 in the partial reproduction data 500a.

In the neighborhood processing execution node 10-2 (node #2), the partial reproduction data creation unit 101a creates the partial reproduction data 500a based on the divided file #2.

The partial reproduction data creation unit 101a of the neighborhood processing execution node 10-2 stores the metadata transmitted together with the partial reproduction data creation instruction from the node determination unit 203 of the management node 20 in the metadata section 501 of the partial reproduction data 500a. The position of the metadata section 501 in the partial reproduction data 500a is preferably the same as the storage position of the metadata in the divided original file.

In the example illustrated in FIG. 10, the partial reproduction data creation unit 101a forms the metadata section 501 at a plurality of positions (two in the example illustrated in FIG. 10) in the partial reproduction data 500a including the beginning thereof, and stores the metadata transmitted from the node determination unit 203 of the management node 20 in these metadata sections 501.

Further, the partial reproduction data creation unit 101a of the neighborhood processing execution node 10-2 sets the divided file section 503 at the same position as the offset value of the divided file #2 in the partial reproduction data 500a. The partial reproduction data creation unit 101a stores the data of the divided file #2 in this divided file section 503.

In the example illustrated in FIG. 10, there is no key frame at each of a position ahead and a position rearward of the processing target frames in the divided file #2. The partial reproduction data creation unit 101a of the neighborhood processing execution node 10-2 requests the storage node 10-1 that stores the divided file #1 preceding this divided file #2 to transmit data from the front end position of the processing target frames to the first (nearest) preceding key frame (data complement request). As a result, the partial reproduction data creation unit 101a of the neighborhood processing execution node 10-2 acquires data that is insufficient for reproduction of the processing target frames in the divided file #2, from the storage node 10-1.

Similarly, the partial reproduction data creation unit 101a of the neighborhood processing execution node 10-2 requests the storage node 10-3 that stores the divided file #3 subsequent to this divided file #2 to transmit data from the rear end position of the processing target frames to the first (nearest) subsequent key frame (data complement request). As a result, the partial reproduction data creation unit 101a of the neighborhood processing execution node 10-2 acquires data that is insufficient for reproduction of the processing target frames in the divided file #2, from the storage node 10-3.

The partial reproduction data creation unit 101a of the neighborhood processing execution node 10-2 stores the data and key frames returned from the storage node 10-1 in response to the data complement request, side by side at a position preceding the divided file #2 in the partial reproduction data 500a.

Similarly, the partial reproduction data creation unit 101a of the neighborhood processing execution node 10-2 stores the data and key frames returned from the storage node 10-3 in response to the data complement request, side by side at a position subsequent to the divided file #2 in the partial reproduction data 500a.

Then, the partial reproduction data creation unit 101a inserts dummy data by using an area, which is the area preceding the divided file section 503 in the partial reproduction data 500a and which is other than the metadata section 501, as the dummy data section 502.

This completes the creation of the partial reproduction data 500a by the partial reproduction data creation unit 101a of the neighborhood processing execution node 10-2.

In the neighborhood processing execution node 10-3 (node #3), the partial reproduction data creation unit 101a creates the partial reproduction data 500a based on the divided file #3.

The partial reproduction data creation unit 101a of the neighborhood processing execution node 10-3 stores the metadata transmitted together with the partial reproduction data creation instruction from the node determination unit 203 of the management node 20 in the metadata section 501 of the partial reproduction data 500a. The position of the metadata section 501 in the partial reproduction data 500a is preferably the same as the storage position of the metadata in the divided original file.

In the example illustrated in FIG. 10, the partial reproduction data creation unit 101a forms the metadata section 501 at a plurality of positions (two in the example illustrated in FIG. 10) in the partial reproduction data 500a including the beginning thereof, and stores the metadata transmitted from the node determination unit 203 of the management node 20 in these metadata sections 501.

Further, the partial reproduction data creation unit 101a of the neighborhood processing execution node 10-3 sets the divided file section 503 at the same position as the offset value of the divided file #3 in the partial reproduction data 500a. The partial reproduction data creation unit 101a stores the data of the divided file #3 in this divided file section 503.

In the example illustrated in FIG. 10, there is no key frame at each of a position ahead and a position rearward of the processing target frames in the divided file #3. The partial reproduction data creation unit 101a of the neighborhood processing execution node 10-3 requests the storage node 10-2 that stores the divided file #2 preceding this divided file #3 to transmit data from the front end position of the processing target frames to the first (nearest) preceding key frame (data complement request). As a result, the partial reproduction data creation unit 101a of the neighborhood processing execution node 10-3 acquires data that is insufficient for reproduction of the processing target frames in the divided file #3, from the storage node 10-2.

Similarly, the partial reproduction data creation unit 101a of the neighborhood processing execution node 10-3 requests the storage node 10-4 that stores the divided file #4 subsequent to this divided file #3 to transmit data from the rear end position of the processing target frames to the first (nearest) subsequent key frame (data complement request). As a result, the partial reproduction data creation unit 101a of the neighborhood processing execution node 10-3 acquires data that is insufficient for reproduction of the processing target frames in the divided file #3, from the storage node 10-4.

The partial reproduction data creation unit 101a of the neighborhood processing execution node 10-3 stores the data and key frames returned from the storage node 10-2 in response to the data complement request, side by side at a position preceding the divided file #3 in the partial reproduction data 500a.

Similarly, the partial reproduction data creation unit 101a of the neighborhood processing execution node 10-3 stores the data and key frames returned from the storage node 10-4 in response to the data complement request, side by side at a position subsequent to the divided file #3 in the partial reproduction data 500a.

Then, the partial reproduction data creation unit 101a inserts dummy data by using an area, which is the area preceding the divided file section 503 in the partial reproduction data 500a and which is other than the metadata section 501, as the dummy data section 502.

This completes the creation of the partial reproduction data 500a by the partial reproduction data creation unit 101a of the neighborhood processing execution node 10-3.

In the example illustrated in FIG. 10, the neighborhood processing execution node 10-1 (node #1) reproduces the data range (moving image data) corresponding to the processing target frames in the created partial reproduction data 500a, and executes the specified script.

Further, the neighborhood processing execution node 10-2 (node #2) reproduces the data range (moving image data) sandwiched by the key frames, which corresponds to the processing target frames, in the created partial reproduction data 500a, and executes the specified script.

The neighborhood processing execution node 10-3 (node #3) reproduces the data range (moving image data) from the beginning of the key frames to the end of the processing target frames in the created partial reproduction data 500a, and executes the specified script.

(B) Operation

The neighborhood processing in the distributed storage system 1 as an example of the second embodiment configured as described above will be described according to the sequence diagram illustrated in FIG. 11.

Figure 11:
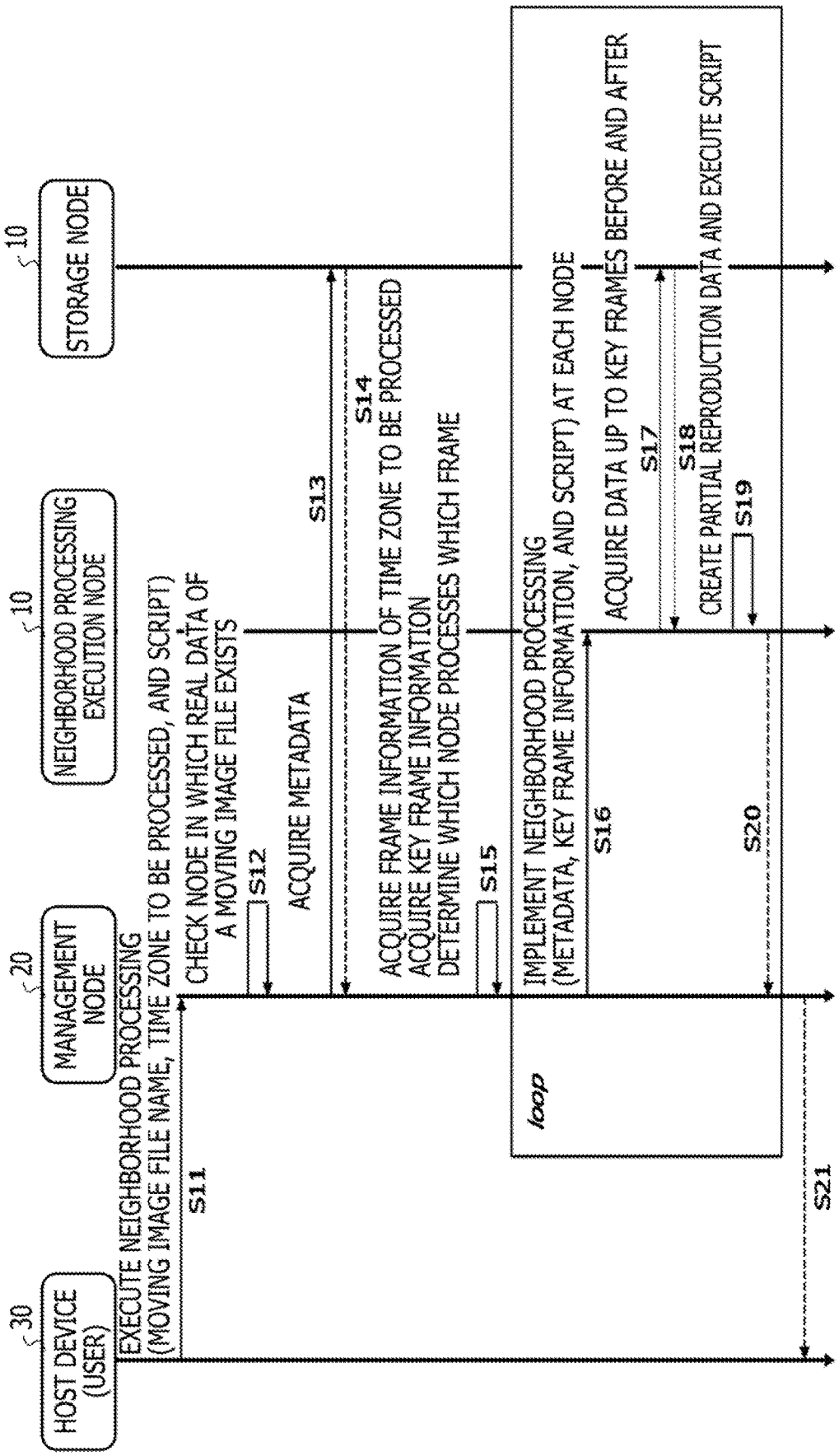
FIG. 11 is a sequence diagram illustrating neighborhood processing in the distributed storage system as an example of the second embodiment.

In the example illustrated in FIG. 11, the host device 30, the management node 20, the neighborhood processing execution node 10, and the storage node 10 other than the neighborhood processing execution node 10 are illustrated.

When the user inputs a neighborhood processing instruction in the host device 30, the host device 30 transmits to the management node 20 a neighborhood processing execution request including a file name for identifying a processing target moving image (divided original file), processing target frames (target_frames), and a script for neighborhood processing (see arrow S11). The processing target frames corresponds to a time zone for which the user wants to perform the neighborhood processing in the moving image file.

In the management node 20, the node determination unit 203 notifies the distributed file management unit 201 of, for example, the processing target frames (target_frames) included in the neighborhood processing execution request. The distributed file management unit 201 refers to the divided file management information based on the moving image file name to check the storage node 10 that stores the divided file (processing target divided file) including the frames (target_frames), and notifies the node determination unit 203 of the storage node (neighborhood processing execution node) 10. The node determination unit 203 determines the storage node 10 returned from the distributed file management unit 201 as the neighborhood processing execution node 10 (see arrow S12).

In the management node 20, the metadata acquisition unit 204 inquires of the distributed file management unit 201 about the storage node 10 that stores the metadata of the divided original file. The distributed file management unit 201 refers to the divided file management information to identify the storage node 10 that stores the metadata, and responds to the metadata acquisition unit 204 with the metadata position information.

The metadata acquisition unit 204 transmits a metadata request notification requesting transmission of metadata to the storage node 10 specified by the metadata position information returned from the distributed file management unit 201 (see arrow S13).

The storage node 10 that has received the metadata request notification responds to the management node 20 with the metadata of the divided original file stored in the own storage device 40 thereof (see arrow S14).

In the management node 20, the node determination unit 203 refers to the divided file management information managed by the distributed file management unit 201 based on the neighborhood processing execution request input by the user to acquire the frame information of the time zone to be processed.

In the management node 20, the key frame information acquisition unit 205 acquires the positions of the key frames regarding the processing target frames in the divided original file. The key frame information acquisition unit 205 acquires the positions of the key frames at the positions before and after the frames (target_frames) that are the target of the neighborhood processing and input from the host device 30 in the divided original file.

The node determination unit 203 determines which storage node 10 performs neighborhood processing on which frame (divided file) based on the neighborhood processing execution request and the divided original file input by the user (see arrow S15).

The node determination unit 203 transmits the metadata, the key frame information, and the script to the neighborhood processing execution node to execute the neighborhood processing (arrow S16). When there are a plurality of neighborhood processing execution nodes 10, the node determination unit 203 causes each neighborhood processing execution node 10 to execute neighborhood processing.

In the neighborhood processing execution node 10, the partial reproduction data creation unit 101a checks the positions of key frames before and after the processing target frames in the divided file when the divided file is stored in the divided file section 503 of the partial reproduction data 500a. Specifically, the partial reproduction data creation unit 101a checks whether or not there are key frames at a position ahead of the processing target frames and a position rearward of the processing target frames in the divided file.

Then, when the divided file does not include a key frame adjacent to the processing target frames, the partial reproduction data creation unit 101a requests and acquires insufficient data from the end position of the processing target frames to the adjacent key frame from another divided file adjacent to the divided file (see arrows S17 and S18).

The partial reproduction data creation unit 101a links the acquired data of the insufficient portion to the end of the divided file on the key frame absent side, and stores the same in the divided file section 503 of the partial reproduction data 500a together with the partial file. Further, the partial reproduction data creation unit 101a stores the metadata transmitted from the node determination unit 203 of the management node 20 before and after the partial reproduction data creation instruction in the metadata section 501 of the partial reproduction data 500a.

Through these processing, the partial reproduction data creation unit 101a of the neighborhood processing execution node 10 creates partial reproduction data. Further, in the neighborhood processing execution node 10, the neighborhood processing execution unit 105 executes the neighborhood processing by executing the script transmitted together with the execution instruction of the neighborhood processing from the node determination unit 203 of the management node 20 on the created partial reproduction data (arrow S19).

The neighborhood processing execution unit 105 of the neighborhood processing execution node 10 transmits the execution result of the script for the partial reproduction data to the management node 20 (neighborhood processing management unit 202a) as the execution result of the neighborhood processing (see arrow S20). The processing indicated by the arrows S16 to S20 described above is performed in each neighborhood processing execution node 10 (loop processing).

When the neighborhood processing is completed in all the neighborhood processing execution nodes 10 and the processing result is returned, the management node 20 transmits the execution result of the neighborhood processing to the host device 30 (see arrow S21).

(C) Effect

Thus, according to the distributed storage system 1 as an example of the second embodiment, in addition to the same operational effect as the first embodiment described above, even if a key frame is included in the divided original file, the divided file may be reproduced in the neighborhood processing execution node 10, and the neighborhood processing may be executed on the divided file.

(III) Others

Figure 12:
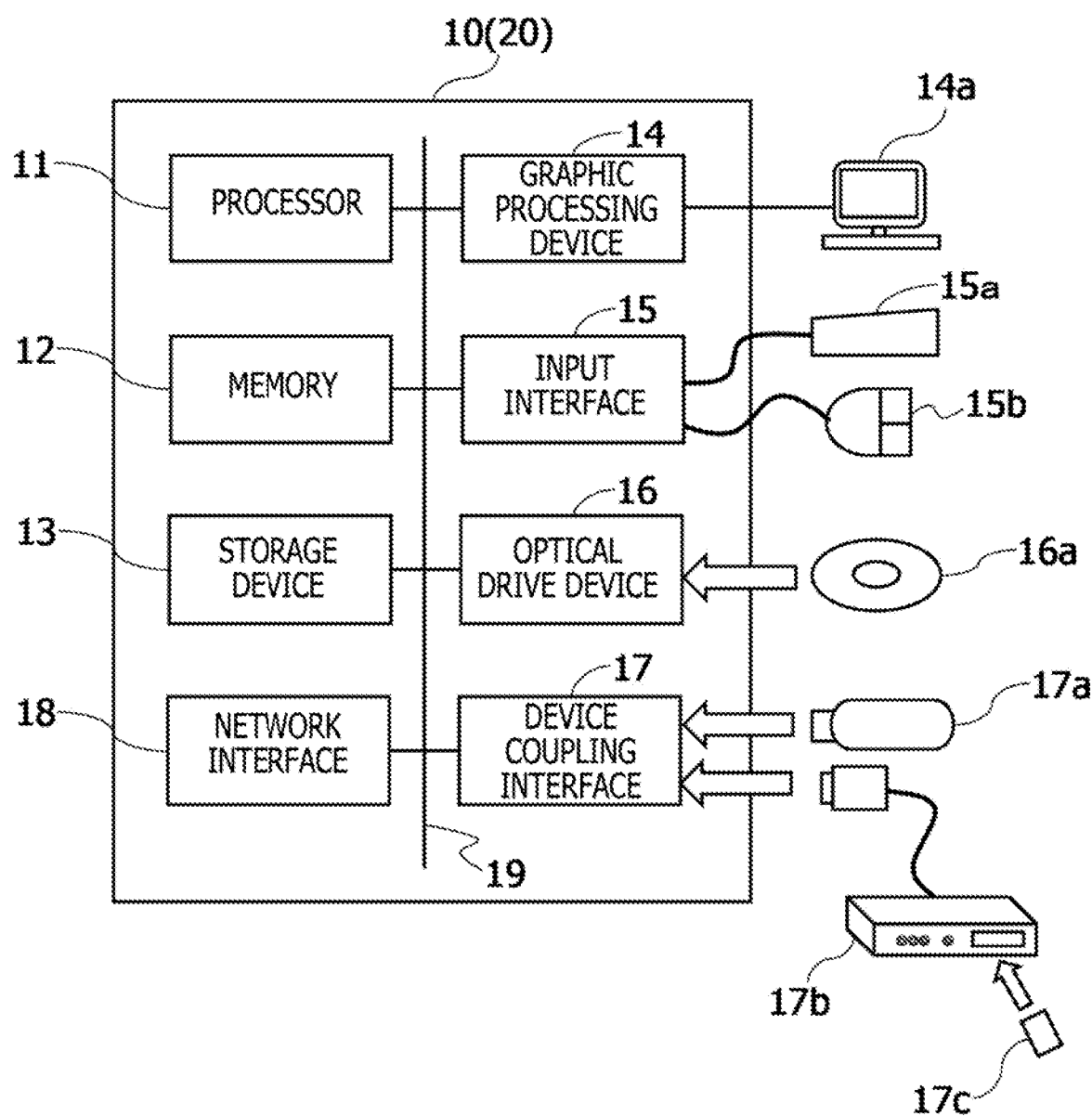
FIG. 12 is a diagram illustrating a hardware configuration of a management node and a storage node of the distributed storage system as an example of the first and second embodiments.

FIG. 12 is a diagram illustrating a hardware configuration of the management node 20 and the storage node 10 of the distributed storage system 1 as an example of the first and second embodiments.

As described above, one storage node 10 of the plurality of storage nodes 10-1 to 10-4 included in the distributed storage system 1 functions as the management node 20. Therefore, the storage node 10 and the management node 20 have the same hardware configuration.

As illustrated in FIG. 12, the storage node 10 (management node 20) includes a processor 11, a memory 12, a storage device 13, a graphic processing device 14, an input interface 15, an optical drive device 16, a device coupling interface 17, and a network interface 18 as constituent elements. These constituent elements 11 to 18 are configured to be able to communicate with each other via a bus 19.

The processor (processing unit) 11 controls the entire storage node 10 (management node 20). The processor 11 may be a multiprocessor. The processor 11 may be any one of a central processing unit (CPU), a microprocessor unit (MPU), a digital signal processor (DSP), an application-specific integrated circuit (ASIC), a programmable logic device (PLD), or a field-programmable gate array (FPGA), for example. Further, the processor 11 may be a combination of two or more elements from among the CPU, the MPU, the DSP, the ASIC, the PLD, and the FPGA.

Then, the functions as the partial reproduction data creation units 101 and 101*a*, the data transmission unit 104, and the neighborhood processing execution unit 105 described above are realized when the processor 11 executes a control program for the storage node 10 (program for the storage node: not illustrated). The storage node management program corresponds to the storage control program.

The functions as the partial reproduction data creation units 101 and 101*a*, the data transmission unit 104, and the neighborhood processing execution unit 105 may be implemented as functions that operate on an operating system (OS) program, for example, or may be implemented as functions of an OS program.

The functions of the partial reproduction data creation units 101 and 101*a*, the data transmission unit 104, and the neighborhood processing execution unit 105 illustrated in FIGS. 2 and 8 are realized when the storage node 10 executes, for example, a program (program for the storage node or OS program) recorded in a computer-readable non-transitory recording medium.

On the other hand, the above-described functions as the distributed file management unit 201 and the neighborhood processing management units 202 and 202*a* are realized when the processor 11 executes a control program for the management node 20 (program for the management node: not illustrated).

The functions as the distributed file management unit 201 and the neighborhood processing management units 202 and 202*a* may be implemented as functions that operate on an operating system (OS) program, or may be implemented as functions of an OS program, for example.

The functions as the distributed file management unit 201 and the neighborhood processing management units 202 and 202*a* illustrated in FIGS. 2 and 8 are realized when the storage node 10 executes, for example, a program (program for the storage node or OS program) recorded in a computer-readable non-transitory recording medium.

The program describing the processing content to be executed by the storage node 10 (management node 20) may be recorded in various recording media. For example, a storage node program (management node program) to be executed by the storage node 10 (management node 20) may be stored in the storage device 13. The processor 11 loads at least a part of the programs in the storage device 13 into the memory 12 and executes the loaded programs.

Further, a program (program for the storage node and program for the management node) to be executed by the processor 11 of the storage node (management node 20) may be recorded in a non-transitory portable recording medium such as an optical disk 16*a*, a memory device 17*a*, a memory card 17*c*. The program stored in the portable recording medium becomes executable after being installed in the storage device 13 under the control of the processor 11, for example. The processor 11 may also directly read and execute the program from the portable recording medium.

The memory 12 is a storage memory including a read-only memory (ROM) and a random-access memory (RAM). The RAM of the memory 12 is used as a main storage device of the storage node 10 (management node 20). The RAM temporarily stores at least a part of an OS program and a control program (storage node program and management node program) to be executed by the processor 11. Further, the memory 12 stores various data used for the processing by the processor 11.

The storage device 13 is a storage device such as a hard disk drive (HDD), a solid-state drive (SSD), a storage class memory (SCM), and the like and stores various data. The storage device 13 is used as an auxiliary storage device of the storage node 10 (management node 20). The storage device 13 stores an OS program, a control program, and various data. The control program includes a storage node program and a management node program.

A semiconductor storage device such as an SCM or a flash memory may be used as the auxiliary storage device. Further, a redundant arrays of inexpensive disks (RAID) may be configured by using a plurality of storage devices 13.

A monitor 14*a* is coupled to a graphic processing device 14. The graphic processing device 14 displays an image in a screen of the monitor 14*a* in accordance with a command from the processor 11. Examples of the monitor 14*a* include a display device using a cathode ray tube (CRT) and a liquid crystal display device.

A keyboard 15*a* and a mouse 15*b* are coupled to the input interface 15. The input interface 15 transmits signals sent from the keyboard 15*a* and the mouse 15*b* to the processor 11. Further, the mouse 15*b* is an example of a pointing device, and other pointing devices may also be used. Examples of the other pointing device include a touch panel, a tablet, a touch pad, and a track ball.

The optical drive device 16 reads data recorded in the optical disk 16*a* using laser light or the like. The optical disk 16*a* is a portable non-transitory recording medium in which data is recorded which is readable using light reflection. Examples of the optical disk 16*a* include a digital versatile disc (DVD), a DVD-RAM, a compact disc read-only memory (CD-ROM), and a CD-recordable (R)/rewritable (RW).

The device coupling interface 17 is a communication interface for coupling peripheral devices to the storage node 10 (management node 20). For example, the device coupling interface 17 may be coupled to the memory device 17*a* or a memory reader/writer 17*b*. The memory device 17*a* is a non-transitory recording medium, such as a Universal Serial Bus (USB) memory, equipped with a communication function with the device coupling interface 17. The memory reader/writer 17*b* writes data to the memory card 17*c* or reads data from the memory card 17*c*. The memory card 17*c* is a card-type non-transitory recording medium.

The network interface 18 is coupled to the network 50. The network interface 18 transmits and receives data to and from other storage nodes 10, the management node 20, and the host device 30 via the network 50. Other information processing devices, communication devices, and the like may be coupled to the network 50.

The storage node 10, the management node 20, and the host device 30 are coupled to the network 50, and the storage node 10 (management node 20) is communicably coupled to other storage nodes 10, the management node 20, the host device 30, and the like via the network interface 18 and the network.

Then, the disclosed technology is not limited to each of the above-described embodiments, and various modifications may be implemented without departing from the spirit of the present embodiment. Each configuration and each processing of the present embodiment may be selected or omitted as appropriate, or may be appropriately combined.

In each of the above-described embodiments, an example in which the divided original file is moving image data is illustrated, but the present disclosure is not limited thereto. In the distributed storage system 1, data other than moving image data may be divided into a plurality of divided files and stored in a plurality of storage nodes 10. The divided original file may be continuous data.

In each of the above-described embodiments, an example in which the distributed file management unit 201 creates a plurality of divided files having a fixed length (same size) based on the divided original file, but the present disclosure is not limited thereto. The distributed file management unit 201 may create a plurality of divided files having variable lengths based on the divided original file.

In each of the above-described embodiments, an example in which one of the plurality of storage nodes 10 included in the distributed storage system 1 functions as the management node 20 has been illustrated, but the present disclosure is not limited thereto. An information processing device that functions as the management node 20 may be provided separately from the storage node 10. Further, the function as the management node 20 may be realized by a plurality of information processing devices.

In each of the above-described embodiments, an example in which the distributed storage system 1 is a distributed object storage system that handles divided data as a file has been described, but the present disclosure is not limited thereto. The distributed storage system 1 may be a block storage system, and may be appropriately modified and implemented.

Further, the present embodiment may be implemented and manufactured by those skilled in the art based on the above disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device configured to operate as one of a plurality of storage control devices in a distributed storage system, the distributed storage system being configured to distributively arrange each of a plurality of pieces of divided data in at least a part of the plurality of storage control devices, the plurality of pieces of divided data being created by dividing original data, the storage control device comprising:
 a memory configured to store program instructions; and
 a processor configured to perform the program instructions, the program instructions including:
  executing an acquisition processing configured to
   in response to a processing request for a first divided data item being any one of the plurality of pieces of divided data,
   identify a storage position indicating a first storage control device, the first storage control device being any one of the plurality of storage control devices and storing management information associated with the original data of the plurality of pieces of divided data to which the first divided data item belongs, the management information being information to be used for reproducing the original data from the first divided data item, and
   acquire the management information from the first storage control device indicated by the identified storage position; and
  executing a creation processing configured to
   establish a storage space having a capacity enough to store the plurality of pieces of divided data to which the first divided data item belongs, the storage space including a first area, a second area, and one or more of third areas,
   store the management information in the first area of the storage space, the first area being an area corresponding to a position of the management information in the original data,
   store the first divided data item in the second area of the storage space, the second area being an area corresponding to a relative position of the first divided data item in the original data, each of the plurality of pieces of divided data having a parameter indicating a respective relative position of that divide data in the original data,
   fill each of the one or more of third areas with dummy data without obtaining a remaining divided data of the plurality of pieces of divided data other than the first divided data item, and
   create reproduction data by using the storage space that has: the first area storing the management information, the second area storing the first divided data, and the one or more of third areas filled with the dummy data, to reproduce a part of the original data corresponding to the first divided data item from the reproduction data.

2. The storage control device according to claim 1, wherein
 the original data includes a plurality of key frames and a plurality of frames arranged between key frames adjacent each other among the plurality of key frames, each of the plurality of key frames being the management information to be used for reproducing the plurality of frames subsequent to that key frame,
 the creation processing is configured to,
 in response to the first divided data item indicated by the processing request not including, among the plurality of key frames, a corresponding key frame to be used for reproducing the first divided data, acquire other divided data including the corresponding key frame from other storage control device.

3. A distributed storage system that includes a plurality of storage nodes and a management node, the management node being configured to manage the plurality of storage nodes, the distributed storage system being configured to distributively store each of a plurality of pieces of divided data in at least a part of the plurality of storage nodes, the plurality of pieces of divided data being generated by dividing original data, the management node including a processor configured to perform program instructions, the program instructions comprising:
 executing an acquisition processing configured to
  in response to a processing request for a first divided data item being any one of the plurality of pieces of divided data, identify a storage position indicating a first storage node, the first storage node being any one of the plurality of storage nodes and storing management information associated with the original data of the plurality of pieces of divided data to which the first divided data item belongs, the management information being information to be used for reproducing the original data from the first divided data item, and acquire the management information from the first storage node indicated by the identified storage position; and executing a creation processing configured to establish a storage space having a capacity enough to store the plurality of pieces of divided data to which the first divided data item belongs, the storage space including a first area, a second area, and one or more of third areas, store the management information in the first area of the storage space, the first area being an area corresponding to a position of the management information in the original data, store the first divided data item in a second area corresponding to a relative position of the divided data in the original data, each of the plurality of pieces of divided data having a parameter indicating a respective relative position of that divide data in the original data, fill each of the one or more of third areas with dummy data without obtaining a remaining divided data of the plurality of pieces of divided data other than the first divided data item, and create reproduction data by using the storage space that has: the first area storing the management information, the second area storing the first divided data, and the one or more of third areas filled with the dummy data, to reproduce a part of the original data corresponding to the first divided data item from the reproduction data.

4. The distributed storage system according to claim 3, wherein the original data includes a plurality of key frames and a plurality of frames arranged between key frames adjacent each other among the plurality of key frames, each of the plurality of key frames being the management information to be used for reproducing the plurality of frames subsequent to that key frame, the creation processing is configured to, in response to the first divided data item indicated by the processing request not including, among the plurality of key frames, a corresponding key frame to be used for reproducing the first divided data, acquire other divided data including the corresponding key frame from other storage control device.

5. A non-transitory computer-readable storage medium for storing a storage control program which causes a processor of a storage control device to perform processing, the storage control device being configured to operate as one of a plurality of storage control devices in a distributed storage system, the distributed storage system being configured to distributively arrange each of a plurality of pieces of divided data in at least a part of the plurality of storage control devices, the plurality of pieces of divided data being generated by dividing original data, the processing comprising:

executing an acquisition processing configured to in response to a processing request for a first divided data item being any one of the plurality of pieces of the divided data, identify a storage position indicating a first storage control device, the first storage control device being any one of the plurality of storage control devices and storing management information associated with the original data of the plurality of pieces of divided data to which the first divided data item belongs, the management information being information to be used for reproducing the original data from the first divided data item, and acquire the management information from the first storage control device indicated by the identified storage position; and executing a creation processing configured to establish a storage space having a capacity enough to store the plurality of pieces of divided data to which the first divided data item belongs, the storage space including a first area, a second area, and one or more of third areas, store the management information in the first area of the storage space, the first area being an area corresponding to a position of the management information in the original data, store the first divided data item in the second area of the storage space, the second area being an area corresponding to a relative position of the first divided data item in the original data, each of the plurality of pieces of divided data having a parameter indicating a respective relative position of that divide data in the original data, and fill each of the one or more of third areas with dummy data without obtaining a remaining divided data of the plurality of pieces of divided data other than the first divided data item, and create reproduction data by using the storage space that has: the first area storing the management information, the second area storing the first divided data, and the one or more of third areas filled with the dummy data, to reproduce a part of the original data corresponding to the first divided data item from the reproduction data.

6. The non-transitory computer-readable storage medium according to claim 5, wherein the original data includes a plurality of key frames and a plurality of frames arranged between key frames adjacent each other among the plurality of key frames, each of the plurality of key frames being the management information to be used for reproducing the plurality of frames subsequent to that key frame, the creation processing is configured to, in response to the first divided data item indicated by the processing request not including, among the plurality of key frames, a corresponding key frame to be used for reproducing the first divided data, acquire other divided data including the corresponding key frame from other storage control device.

* * * * *